United States Patent
Wang et al.

(10) Patent No.: US 7,593,010 B2
(45) Date of Patent: *Sep. 22, 2009

(54) SOFTWARE-IMPLEMENTED TRANSFORM AND LIGHTING MODULE AND PIPELINE FOR GRAPHICS RENDERING ON EMBEDDED PLATFORMS USING A FIXED-POINT NORMALIZED HOMOGENOUS COORDINATE SYSTEM

(75) Inventors: Lifeng Wang, Beijing (CN); Ke Deng, Beijing (CN); Baining Guo, Beijing (CN); Joshua William Buckman, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 965 days.

This patent is subject to a terminal disclaimer.

(21) Appl. No.: 10/666,917

(22) Filed: Sep. 18, 2003

(65) Prior Publication Data
US 2005/0091616 A1    Apr. 28, 2005

(51) Int. Cl.
G06T 15/30    (2006.01)
(52) U.S. Cl. .................................... 345/421
(58) Field of Classification Search ............... None
See application file for complete search history.

(56) References Cited

U.S. PATENT DOCUMENTS

| | | | | |
|---|---|---|---|---|
| 4,615,013 A * | 9/1986 | Yan et al. | ................ | 345/582 |
| 4,987,554 A * | 1/1991 | Kaufman | ................ | 345/424 |
| 5,317,682 A * | 5/1994 | Luken, Jr. | ................ | 345/442 |
| 5,555,355 A * | 9/1996 | Narayanaswami | ........... | 345/621 |
| 5,821,940 A * | 10/1998 | Morgan et al. | ............... | 345/420 |
| 5,856,829 A | 1/1999 | Gray et al. | ................. | 345/422 |
| 5,870,097 A * | 2/1999 | Snyder et al. | ............... | 345/426 |
| 5,877,773 A * | 3/1999 | Rossin et al. | ................ | 345/621 |
| 5,883,641 A * | 3/1999 | Krech et al. | ................ | 345/505 |
| 5,914,726 A * | 6/1999 | Schultz | ........................ | 345/501 |
| 6,115,047 A | 9/2000 | Deering | ..................... | 345/422 |
| 6,169,554 B1 | 1/2001 | Deering | ..................... | 715/764 |
| 6,285,378 B1 * | 9/2001 | Duluk, Jr. | ................... | 345/441 |
| 6,285,779 B1 | 9/2001 | Lapidous et al. | ............ | 382/106 |

(Continued)

OTHER PUBLICATIONS

Direct3D Mobile. 2007. http://msdn2.microsoft.com/en-US/library/aa452478.aspx.*

(Continued)

Primary Examiner—Peter-Anthony Pappas
(74) Attorney, Agent, or Firm—Lyon & Harr, L.L.P.; Craig S. Fischer

(57) ABSTRACT

A software-implemented transform and lighting module and pipeline designed and optimized for embedded platforms (such as mobile computing devices). The transform and lighting module and pipeline includes a number of features that make it well-suited for use on embedded devices. These features include a single streamline branched architecture that allows efficient processing on a CPU of an embedded device and saves computational time. This architecture is facilitated by use of a vertex cache that stores vertices as needed to avoid duplication in processing of the vertices. A culling feature culls vertices before lighting instead of lighting all vertices. A back face culling technique examines each of the vertices to determines whether a back face of a triangle is formed. If so, then the vertex is culled. A second technique involved determining whether a vertex is outside of one view frustum clip plane. If so, then the vertex is culled.

22 Claims, 8 Drawing Sheets

U.S. PATENT DOCUMENTS

| | | | | | |
|---|---|---|---|---|---|
| 6,304,265 | B1* | 10/2001 | Harris et al. | ............... | 345/421 |
| 6,559,856 | B1 | 5/2003 | Fossum et al. | ............... | 345/600 |
| 6,597,363 | B1 | 7/2003 | Duluk et al. | ............... | 345/506 |
| 6,606,097 | B1 | 8/2003 | Fossum | ............... | 345/501 |
| 6,724,394 | B1* | 4/2004 | Zatz et al. | ............... | 345/581 |
| 6,774,895 | B1 | 8/2004 | Papakipos et al. | ............... | 345/422 |
| 7,139,005 | B2* | 11/2006 | Wang et al. | ............... | 345/643 |
| 7,170,512 | B2* | 1/2007 | Southwell et al. | ............... | 345/420 |
| 7,190,362 | B1* | 3/2007 | Baker et al. | ............... | 345/419 |
| 2002/0075285 | A1 | 6/2002 | Morrison | ............... | 345/660 |
| 2002/0171644 | A1 | 11/2002 | Reshetov et al. | ............... | 345/420 |
| 2004/0138560 | A1 | 7/2004 | Paladini | ............... | 600/437 |
| 2004/0145589 | A1 | 7/2004 | Prokopenko et al. | ............... | 345/581 |

OTHER PUBLICATIONS

Woody. Homogeneous Coordinates. Jun. 6, 2002. http://web.archive.org/web/20020602005620/http://alumnus.caltech.edu/~woody/docs/3dmatrix.html.*

Foley et al. Computer Graphics: Principles and Practice. 1997. Addison-Wesley Pub. Co., Inc.*

Smith. The Scientist and Engineer's Guide to Digital Signal Processing. Chapter 28. 1998.*

Olano et al. Triangle Scan Conversion using 2D Homogeneous Coordinates. ACM SIGGRAPH/Eurographics Workshop on Graphics Hardware. 1997.*

Co-pending U.S. Appl. No. 10/661,055, "Optimized Fixed-Point Mathematical Library and Graphics Functions for a Software-Implemented Graphics Rendering System and Method Using a Normalized Homogenous Coordinate System," filed Sep. 13, 2003.

* cited by examiner

SOFTWARE-IMPLEMENTED TRANSFORM AND LIGHTING MODULE AND PIPELINE FOR GRAPHICS RENDERING ON EMBEDDED PLATFORMS USING A FIXED-POINT NORMALIZED HOMOGENOUS COORDINATE SYSTEM

TECHNICAL FIELD

The present invention relates in general to graphics rendering systems and more particularly to a software-implemented transform and lighting module and pipeline designed and optimized for embedded platforms (such as mobile computing devices) that is based on fixed-point operations including a variable-length fixed point representation for numbers and a normalized homogenous coordinates system for vector operations.

BACKGROUND OF THE INVENTION

The importance of three-dimensional (3D) enabled embedded platforms has become increasingly important due to users' expectations of multimedia-rich environments in products ranging from DVD players, set-top boxes, Web pads and mobile computing device (including handheld computing devices) to navigational equipment and medical instrumentation. As users continue to expect equal or nearly equal graphics quality on embedded devices as on their desktop systems, applications designed to run on embedded platforms continue to converge with their desktop equivalents. Thus, the need for 3D graphics rendering is vital in today's embedded systems.

One of the more popular 3D rendering standards available today is Direct3D by Microsoft® Corporation. Direct 3D is an application-programming interface (API) for manipulating and displaying 3D objects. Direct3D provide programmers and developers with a way to develop 3D applications that can utilize whatever graphics acceleration hardware is installed on the system. Direct3D does an excellent job in supporting efficient rendering in desktop applications. These desktop systems typically have powerful central processing units (CPUs), math coprocessors, and graphics processing units (GPUs).

Typical graphic rendering standards (such as Direct3D) designed for desktop systems use floating-point operations for the transform and lighting process. In embedded systems, however, the CPUs may not be powerful enough to support floating-point operations and there is typically no coprocessor or GPU for accelerating the floating-point operations. Thus, software-implemented transform and lighting is important and useful for use on embedded platforms.

Current software-implemented transform and lighting (T&L) pipelines are based on floating-point operations. These pipelines assume that powerful graphics hardware and processors are available. However, these current T&L processing pipelines based on floating-point operations are based on execution by a GPU (such as is available on a desktop system) instead of only a CPU (as typically is available in an embedded platform). Moreover, floating-point software routines are notoriously slow, expensive, require large amounts of memory, and have a large code size. Therefore, there exists a need for a software-implemented T&L pipeline that is optimized for operation on an embedded platform and does not require powerful hardware and processing power. There is also so need for a software-implemented T&L pipeline that is fast, efficient, requires little memory and has a small code size such that it is ideal for embedded platforms.

SUMMARY OF THE INVENTION

The invention disclosed herein includes a transform and lighting module and method (or pipeline) that is optimized for use on embedded platforms (such as mobile computing devices). The transform and lighting module and pipeline include of number of features that are designed specifically to increase efficiency and performance on embedded devices. Specifically, current graphics standards are designed for desktop systems having math coprocessors and graphics processing units (GPU) in addition to a central processing unit (CPU). In addition, the CPUs of these desktop systems typically run several operations (or streamlines) at once and are highly parallelized. However, embedded devices often lack coprocessors and GPUs, and have CPUs that run a single streamline and a not designed for parallel operations.

The transform and lighting module and pipeline includes a single streamline branched architecture that allows efficient processing on a CPU of an embedded device and saves computational time. This architecture is facilitated by use of a vertex cache that stores vertices as needed to avoid duplication in processing of the vertices. For example, if some input vertices have already been lit, then those vertices are sent to the vertex cache to avoid the lighting processing and thereby avoid duplicate processing. The vertex cache is implemented in software and not hardware. This alleviates the need for additional hardware that is at a premium in an embedded device.

The transform and lighting module and pipeline also improve efficiency by use of a culling module. The culling module is positioned before the lighting module to examine each vertex and determine whether to cull or keep the vertex. Culling is performed using back face culling and view frustum culling. By discarding the vertices that do not need to be lit or are not needed, the culling module decreases the number of vertices being processed by the lighting module. Since the lighting module is the most computationally intensive module of the transform and lighting module, this improves processing efficiency.

In general, the transform and lighting module inputs data in 3D, processes the data, and outputs the data in 2D screen coordinates. The transform and lighting module includes the transformation module that converts the input rendering data from model space to clip space. The vertex cache, which is software implemented, is used to store the vertices as needed. The culling module examines each vertex to determine whether it should be culled. If so, then it is discarded. Otherwise, the processing continues on the vertex.

Culling is performed in at least one of two ways. First, a back face culling technique examines each of the vertices to determines whether a back face of a triangle is formed. If so, then the vertex is culled. A second technique involved determining whether a vertex is outside of one view frustum clip plane. If so, then the vertex is culled.

The transform and lighting module also includes a lighting module, for computing color from the vertices, and a transformation generation and transformation module, for computing clip space coordinates. The transform and lighting module also includes view frustum clipping module that involves interpolation of the color and the texture of the vertices. The view frustum clipping module is designed for normalized homogenous coordinate system (NHCS) fixed-point operations and processes the clip space coordinates. The view frustum clipping module works with both vertex transformed by the texture generation and transformation module and on vertex transformed by an application outside of the transform and lighting module.

The transform and lighting pipeline includes inputting rendering data containing vertices. The rendering data is in model space. The rendering data then is transformed from model space into clip space. Each of the vertices then are examined prior to lighting to determine whether to cull the vertex. Culled vertices are discarded and the remainder is kept. The vertices are stored in a vertex cache as needed. The vertex cache is software-implemented and facilitates a single streamline branched architecture. This architecture avoids duplication in processing of the vertices. View frustum clipping is performed on clip space coordinates after lighting and texture generation and transformation of their vertices. Preferably, the clip space coordinates are NHCS clip space coordinates. The output of the transform and lighting pipeline are 2D screen coordinates.

BRIEF DESCRIPTION OF THE DRAWINGS

The present invention can be further understood by reference to the following description and attached drawings that illustrate aspects of the invention. Other features and advantages will be apparent from the following detailed description of the invention, taken in conjunction with the accompanying drawings, which illustrate, by way of example, the principles of the present invention.

Referring now to the drawings in which like reference numbers represent corresponding parts throughout.

DETAILED DESCRIPTION OF THE INVENTION

In the following description of the invention, reference is made to the accompanying drawings, which form a part thereof, and in which is shown by way of illustration a specific example whereby the invention may be practiced. It is to be understood that other embodiments may be utilized and structural changes may be made without departing from the scope of the present invention.

I. General Overview

Typical graphic rendering standards (such as Direct3D) designed for desktop systems use floating-point operations for the transform and lighting process. In embedded systems, however, the CPUs may not be powerful enough to support floating-point operations and there is typically no coprocessor or GPU for accelerating the floating-point operations. Thus, software-implemented transform and lighting is important and useful for use on embedded platforms.

The transform and lighting module and pipeline disclosed herein is optimized for use on embedded platforms (such as mobile computing devices). The transform and lighting module and pipeline is designed specifically to increase efficiency and performance on embedded devices and does not require powerful processors or graphics hardware. The transform and lighting module and pipeline includes a single streamline branched architecture that allows efficient processing on a CPU of an embedded device and saves computational time. This architecture is facilitated by use of a vertex cache that stores vertices as needed to avoid duplication in processing of the vertices. The transform and lighting (T&L) module and pipeline differ from existing T&L techniques as follows. First, the T&L module and pipeline is a single pipeline, while existing techniques are multiple pipeline. Second, the T&L module and pipeline reduces the lighting processing by culling vertices before lighting, while existing T&L techniques transform and light all vertices. Third, the T&L module and pipeline includes a software-implemented vertex cache that is located in the T&L module, while existing T&L techniques may include a vertex cache between the T&L layer and the rasterizer. These differences make the T&L module and pipeline disclosed herein more efficient and practical for use on embedded devices.

Figure 1:
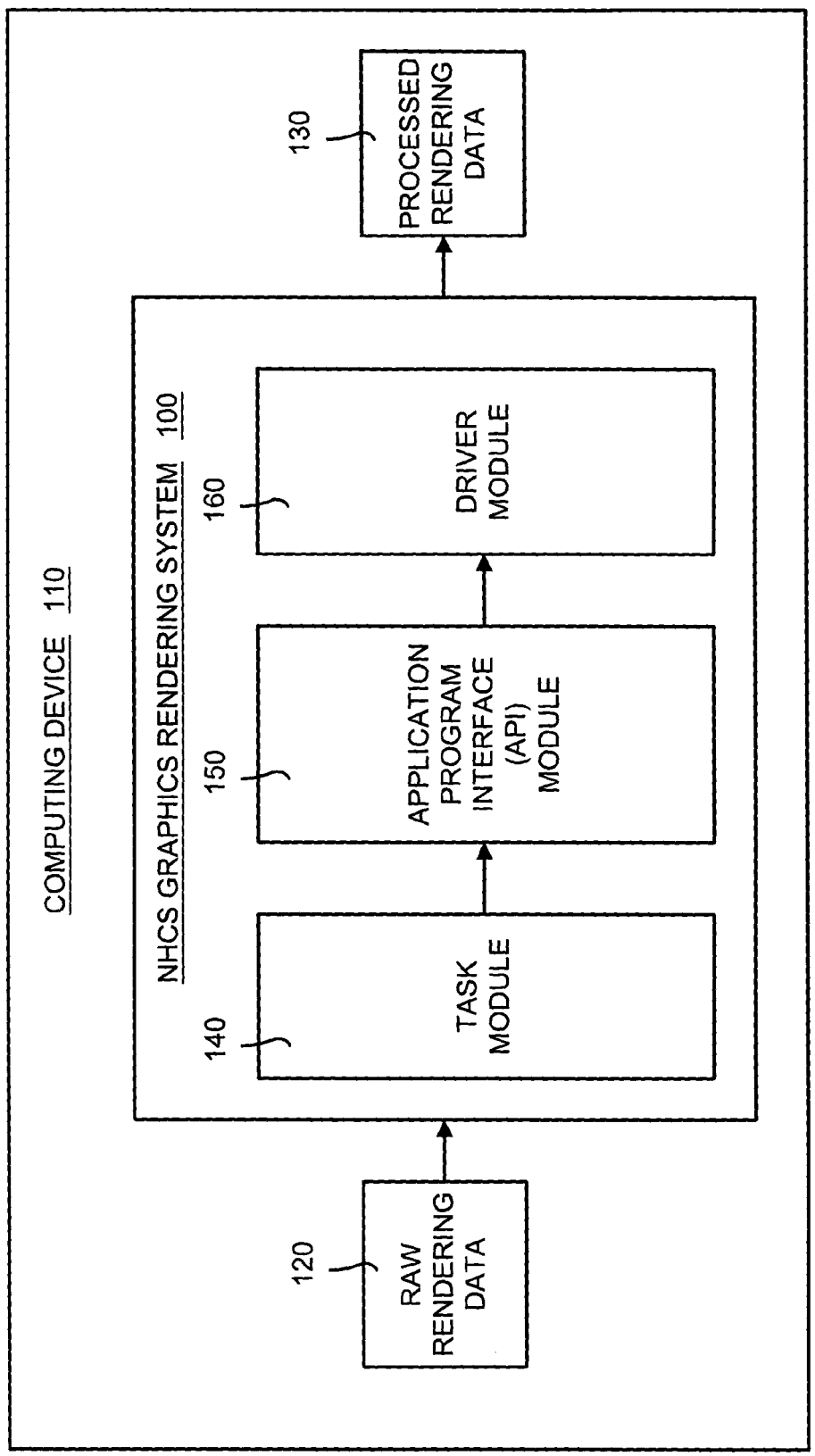
FIG. 1 is a block diagram illustrating a general overview of the NHCS graphics rendering system including a transform and lighting module that resides on the driver module.

FIG. 1 is a block diagram illustrating a general overview of a NHCS graphics rendering system 100 including a transform and lighting module disclosed herein. The system 100 typically resides on a computing device 110, such as a mobile computing device. In general, the system 100 inputs raw rendering data 120, processes the data 120 and outputs processed rendering data 130 suitable for rendering by a rendering engine (not shown). The raw rendering data 120 typically is in a floating-point format.

As shown in FIG. 1, the NHCS graphics rendering system 100 includes a task module 140, an application program interface (API) module 150, and a driver module 160. The task module 140 inputs the raw rendering data 120 in a floating-point format and converts the data 120 into a desired fixed-point format. In some embodiments, the task module 140 is capable of converting the data 120 in a floating-point format into either a traditional fixed-point format or a preferred NHCS fixed-point format. The converted data then is sent to the API module 150. The API module 150 creates buffers for storing the converted data. In addition, the API module 150 prepares a command buffer for the driver module 160. The driver module 160 contains the mathematical operation and graphics functions to prepare the data for rendering. The data is in a fixed-point format (preferably a NHCS fixed-point format) and the mathematical operation and graphics functions are specially created to process the fixed-point data. As explained in detail below, the transform and lighting module is contained in the driver module 160. The output is the processed rendering data 130 that is ready to be rendered by a rendering engine.

II. Exemplary Operating Environment

The transform and lighting module and method disclosed herein and contained within the NHCS graphics rendering system 100 is designed to operate in a computing environment. The following discussion is intended to provide a brief, general description of a suitable computing environment in which the transform and lighting module and method may be implemented.

Figure 2:
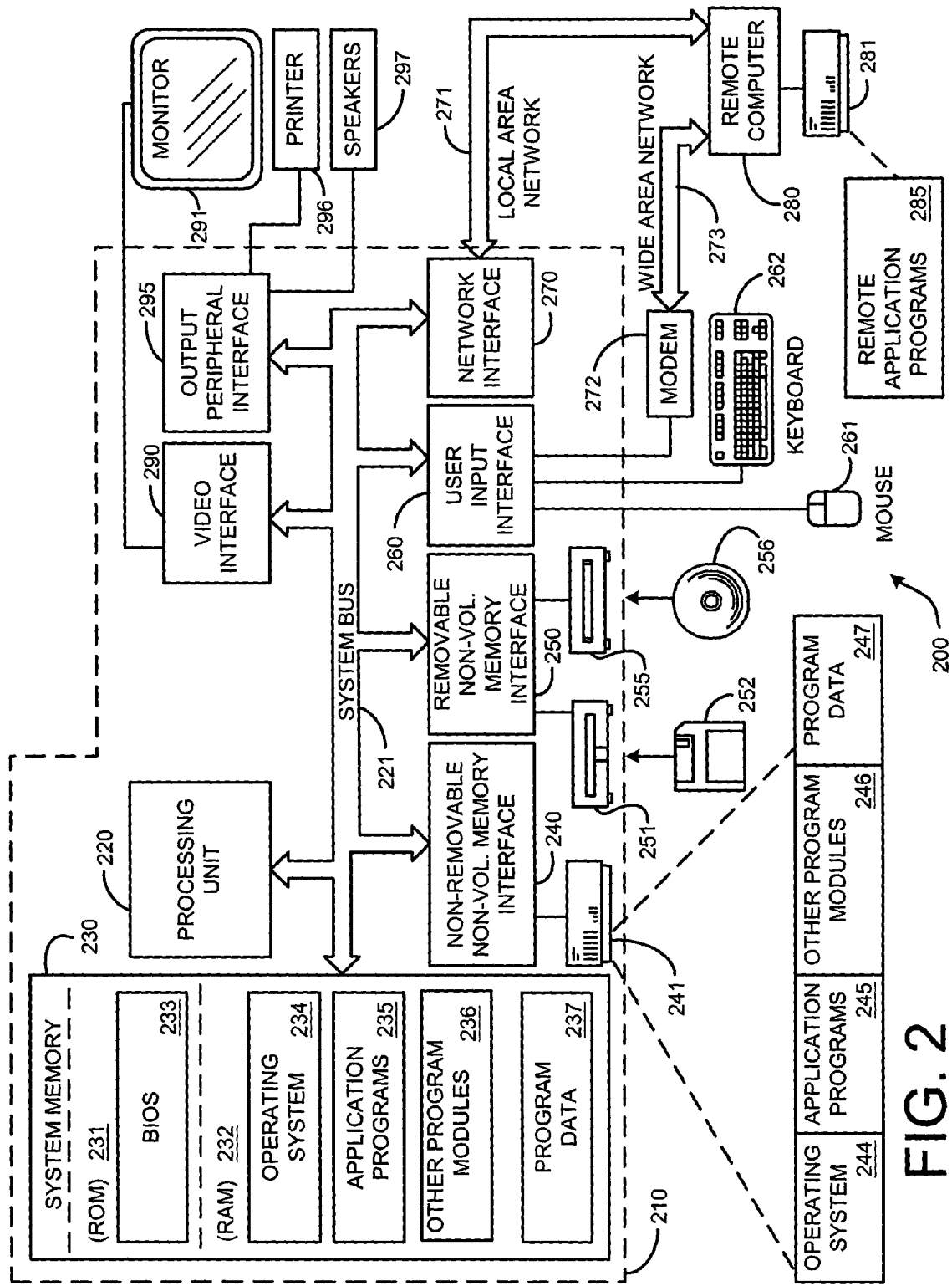
FIG. 2 illustrates an example of a suitable computing system environment in which the transform and lighting module and method may be implemented.

FIG. 2 illustrates an example of a suitable computing system environment 200 in which the transform and lighting module and method may be implemented. The computing system environment 200 is only one example of a suitable computing environment and is not intended to suggest any limitation as to the scope of use or functionality of the invention. Neither should the computing environment 200 be interpreted as having any dependency or requirement relating to any one or combination of components illustrated in the exemplary operating environment 200.

The transform and lighting module and method are operational with numerous other general purpose or special purpose computing system environments or configurations. Examples of well known computing systems, environments, and/or configurations that may be suitable for use with the transform and lighting module and method include, but are not limited to, personal computers, server computers, handheld, laptop or mobile computer or communications devices such as cell phones and PDA's, multiprocessor systems, microprocessor-based systems, set top boxes, programmable consumer electronics, network PCs, minicomputers, mainframe computers, distributed computing environments that include any of the above systems or devices, and the like.

The transform and lighting module and method may be described in the general context of computer-executable instructions, such as program modules, being executed by a computer. Generally, program modules include routines, programs, objects, components, data structures, etc., that perform particular tasks or implement particular abstract data types. The invention may also be practiced in distributed computing environments where tasks are performed by remote processing devices that are linked through a communications network. In a distributed computing environment, program modules may be located in both local and remote computer storage media including memory storage devices. With reference to FIG. 2, an exemplary system for implementing the transform and lighting module and method contained on the NHCS graphics rendering system 100 includes a general-purpose computing device in the form of a computer 210 (the computer 210 is an example of the computing device 110 shown in FIG. 1).

Components of the computer 210 may include, but are not limited to, a processing unit 220, a system memory 230, and a system bus 221 that couples various system components including the system memory to the processing unit 220. The system bus 221 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

The computer 210 typically includes a variety of computer readable media. Computer readable media can be any available media that can be accessed by the computer 210 and includes both volatile and nonvolatile media, removable and non-removable media. By way of example, and not limitation, computer readable media may comprise computer storage media and communication media. Computer storage media includes volatile and nonvolatile removable and non-removable media implemented in any method or technology for storage of information such as computer readable instructions, data structures, program modules or other data.

Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by the computer 210. Communication media typically embodies computer readable instructions, data structures, program modules or other data in a modulated data signal such as a carrier wave or other transport mechanism and includes any information delivery media.

Note that the term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

The system memory 230 includes computer storage media in the form of volatile and/or nonvolatile memory such as read only memory (ROM) 231 and random access memory (RAM) 232. A basic input/output system 233 (BIOS), containing the basic routines that help to transfer information between elements within the computer 210, such as during start-up, is typically stored in ROM 231. RAM 232 typically contains data and/or program modules that are immediately accessible to and/or presently being operated on by processing unit 220. By way of example, and not limitation, FIG. 2 illustrates operating system 234, application programs 235, other program modules 236, and program data 237.

The computer 210 may also include other removable/non-removable, volatile/nonvolatile computer storage media. By way of example only, FIG. 2 illustrates a hard disk drive 241 that reads from or writes to non-removable, nonvolatile magnetic media, a magnetic disk drive 251 that reads from or writes to a removable, nonvolatile magnetic disk 252, and an optical disk drive 255 that reads from or writes to a removable, nonvolatile optical disk 256 such as a CD ROM or other optical media.

Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 241 is typically connected to the system bus 221 through a non-removable memory interface such as interface 240, and magnetic disk drive 251 and optical disk drive 255 are typically connected to the system bus 221 by a removable memory interface, such as interface 250.

The drives and their associated computer storage media discussed above and illustrated in FIG. 2, provide storage of computer readable instructions, data structures, program modules and other data for the computer 210. In FIG. 2, for example, hard disk drive 241 is illustrated as storing operating system 244, application programs 245, other program modules 246, and program data 247. Note that these components can either be the same as or different from operating system 234, application programs 235, other program modules 236, and program data 237. Operating system 244, application programs 245, other program modules 246, and program data 247 are given different numbers here to illustrate that, at a minimum, they are different copies. A user may enter commands and information into the computer 210 through input devices such as a keyboard 262 and pointing device 261, commonly referred to as a mouse, trackball or touch pad.

Other input devices (not shown) may include a microphone, joystick, game pad, satellite dish, scanner, radio receiver, or a television or broadcast video receiver, or the like. These and other input devices are often connected to the processing unit 220 through a user input interface 260 that is coupled to the system bus 221, but may be connected by other interface and bus structures, such as, for example, a parallel port, game port or a universal serial bus (USB). A monitor 291 or other type of display device is also connected to the system bus 221 via an interface, such as a video interface 290. In addition to the monitor, computers may also include other peripheral output devices such as speakers 297 and printer 296, which may be connected through an output peripheral interface 295.

The computer 210 may operate in a networked environment using logical connections to one or more remote computers, such as a remote computer 280. The remote computer 280 may be a personal computer, a server, a router, a network PC, a peer device or other common network node, and typically includes many or all of the elements described above relative to the computer 210, although only a memory storage device 281 has been illustrated in FIG. 2. The logical connections depicted in FIG. 2 include a local area network (LAN) 271 and a wide area network (WAN) 273, but may also include other networks. Such networking environments are commonplace in offices, enterprise-wide computer networks, intranets and the Internet.

When used in a LAN networking environment, the computer 210 is connected to the LAN 271 through a network interface or adapter 270. When used in a WAN networking environment, the computer 210 typically includes a modem 272 or other means for establishing communications over the WAN 273, such as the Internet. The modem 272, which may be internal or external, may be connected to the system bus 221 via the user input interface 260, or other appropriate mechanism. In a networked environment, program modules depicted relative to the computer 210, or portions thereof, may be stored in the remote memory storage device. By way of example, and not limitation, FIG. 2 illustrates remote application programs 285 as residing on memory device 281. It will be appreciated that the network connections shown are exemplary and other means of establishing a communications link between the computers may be used.

III. System Components

Figure 3:
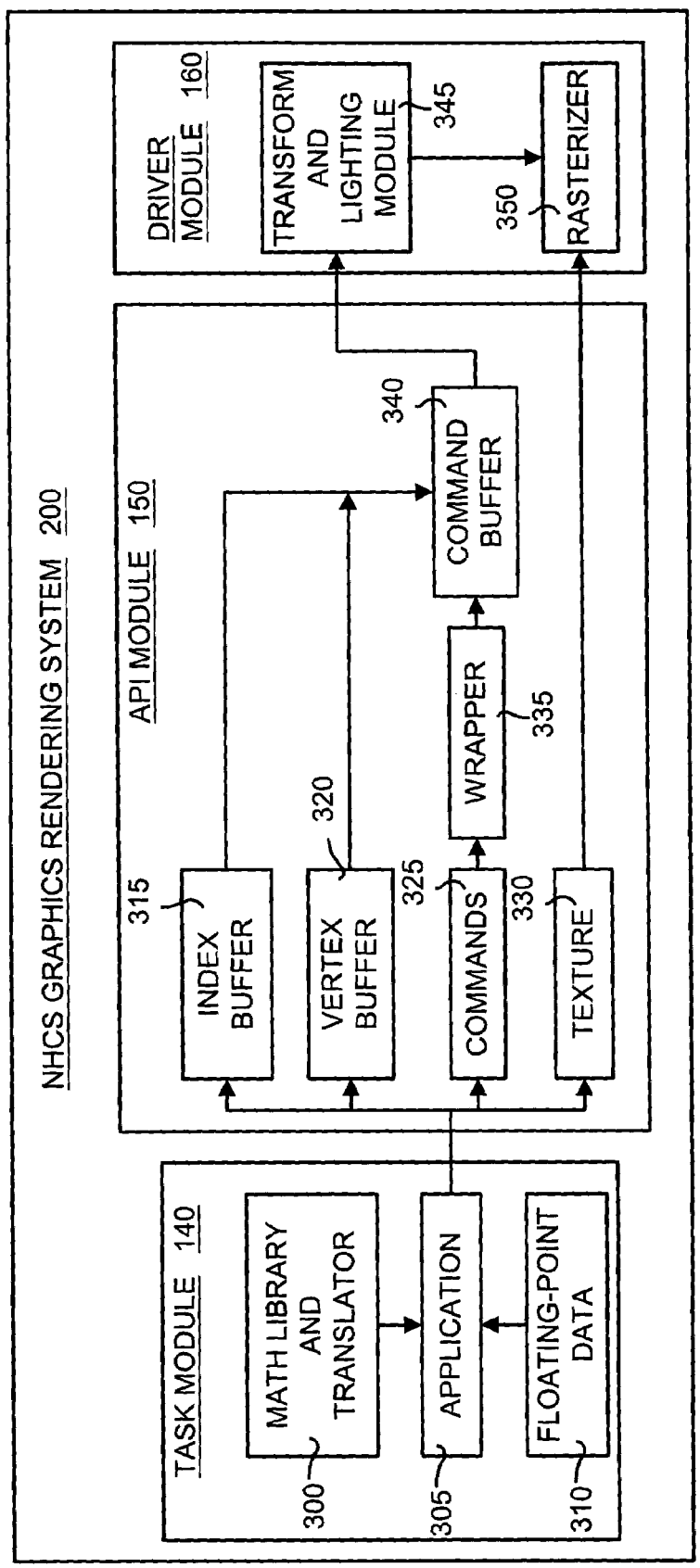
FIG. 3 is a block diagram illustrating the details of an exemplary implementation of the NHCS graphics rendering system and shown in FIG. 1.

FIG. 3 is a block diagram illustrating the details of an exemplary implementation of the NHCS graphics rendering system 100 shown in FIG. 1. In this exemplary implementation, the NHCS graphics rendering system 100 is implemented in a Direct3D mobile environment. Microsoft® Corporation in Redmond, Wash., developed Direct3D (D3D) and it has become a rendering standard. Traditionally, D3D supports efficient rendering in desktop personal computer (PC) applications. These PCs typically have powerful CPUs and GPUs and can support intensive graphics rendering. For other embedded devices, such as mobile computing devices, D3D dos not fit because it needs powerful processing units. The NHCS graphics rendering system and method disclosed herein enables the use of D3D on mobile computing devices (D3DM). The NHCS graphics rendering system and method includes a software-based transform and lighting module having a fixed-point mathematical library and corresponding graphics functions. The mathematical library is optimized for use on mobile computing devices and makes efficient use of the limited resources available on mobile computing devices.

The basic structure of D3DM is that there is a "thin" API module and a "thick" driver module. In the thin API module, the interface is simple and straightforward. Thus, the API code provides integration with the operating system and hosting for the display driver, but does not provide any actual drawing code. In the thick driver module, most of the work is forwarded by the API module and performed in the driver module. Thus, the thick driver module includes drawing code, which may only be overridden by the display driver.

The design of D3DM is based on the fact that models can be described in terms of primitives. In turn, each primitive is described in terms of a plurality of vertexes (or vertices). A vertex is the point at which two lines meet. The vertex carries a great of information. For example, the vertex contains the 3-D coordinates and weight. In addition, there is color information, often specified in the form of a diffuse and a specular color. This color data is commonly coded in the "RGBA" format (for red, green, blue and alpha). The vertex also contains a normal, the vector that is orthogonal to its surface, and the texture coordinates that represent the texture and its position for the vertex. The vertex may have several texture coordinates in case more than one texture is applied to the vertex. Further, the vertex may contain texture fog as well as other information such as point size. Thus, the vertex, the smallest unit in a 3-D scene, contains a large amount of information.

D3DM loads this data for the vertex into vertex buffers. The data then is processed by the transform and lighting (T&L) module where the output is pixel color values for a frame buffer. The transform and lighting module and method contain a mathematical library that is used by D3DM. The mathematical library is used to implement the transform and lighting. The D3DM drivers expose all of the features of the mobile computing device on which an application is running, thus achieving maximum drawing performance.

Referring to FIG. 3, the task module 140 includes a math library and translator 300, an application 305, and floating-point data 310. In general, the task module 140 inputs the floating-point data 310 and converts the data 310 into a fixed-point format or a NHCS fixed-point format. The converted data then is sent to buffers created by the API module 150. The math library and translator 300 converts the data 310 and performs preliminary mathematical operations on the converted data. In addition, the math library and translator 300 defines a specific data structure for the converted data. The preliminary mathematical operations and data structure definitions are discussed in detail below.

The API module 150 creates buffers for storing the converted data and preparing the data for the driver module 160. The API module 150 includes an index buffer 315, for storing indices, and a vertex buffer 320, for storing vertex information. The index buffer holds a value for each vertex. The value is called an index. Indices are used to retrieve a vertex in the vertex buffer. Each index is an offset in the current vertex buffer of the data for this vertex. This allows for the sharing of vertex data between multiple vertices and avoids the duplicated storage of vertices when two neighboring triangles share vertices. The API module 150 also includes commands 325 that provide instructions for the rendering and texture 330 that provides texture information. The API module 150 includes a wrapper 335 that packages the commands 325 and provides convenience, compatibility and security for the commands 325. This ensures the that the commands 325 are ready for the driver module 160. A command buffer 340 stores the wrapper 335 prior to them being sent to the driver module 160.

The driver module 160 prepares data for the raster. In addition, the driver module 160 prepares the data for use by a rendering engine. This means that the data is translated into the language of the computing device's graphics hardware and causes particular primitives to be drawn. The driver module 160 includes the transform and lighting (T&L) module 345 and a rasterizer 350. The T&L module 345 includes all necessary mathematical operations and graphic functions in the NHCS fixed-point data format. The T&L module 345 is discussed in detail below. The rasterizer prepares the rendering data to be sent to the raster.

IV. Transform and Lighting Module

In general, the transform and lighting module 345 is a single streamline branched pipeline that takes input data in 3D and processes the input data into output data containing 2D screen coordinates. The single streamline branched pipeline is particularly well-suited for less powerful CPUs, such as those CPUs contained on embedded devices. The single streamline branched pipeline architecture of the transform and lighting module 345 saves computational time and greatly increases efficiency. Transform and lighting processing in desktops and other systems having graphics processing unit (GPU) is quite different from the single streamline branched pipeline T&L processing using a low-power CPU. With a GPU, T&L processing is highly parallelized (i.e., multiple streamlines) and branches are not necessary. In fact, branches can stall the streamlines and slow down the processing and computation.

Figure 4:
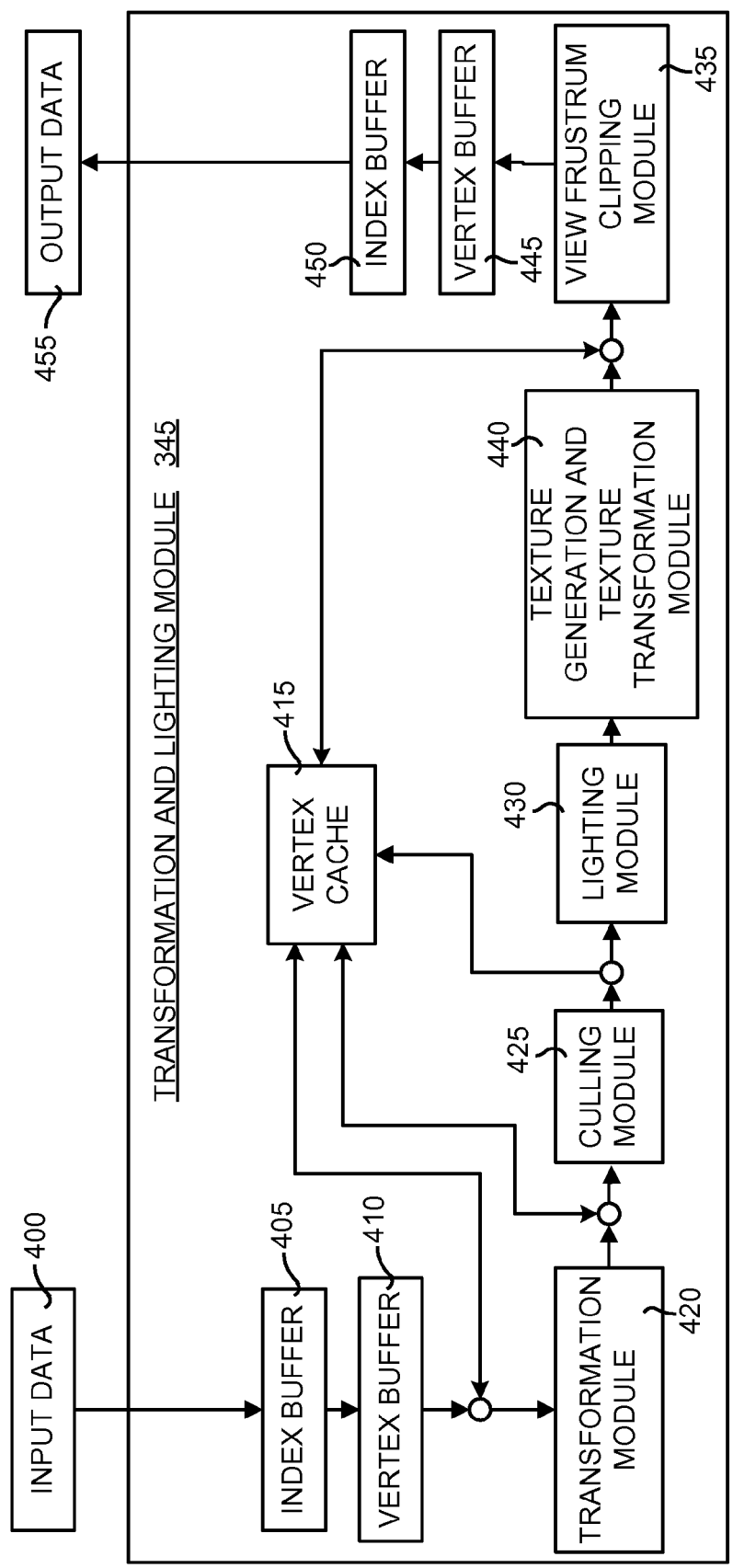
FIG. 4 is a detailed block diagram illustrating the details of the transform and lighting module shown in FIG. 3.

FIG. 4 is a detailed block diagram illustrating the details of the transform and lighting module 345 shown in FIG. 3. The transform and lighting module 345 receives input data 400 that is 3D data. An index buffer 405 stores indices of the input data 400 and a vertex buffer 410 stores vertex information of the input data 400. A determination is made as to whether the vertex information of the input data 400 has been previously transformed. If the vertex information has been previously transformed, vertex information is sent to a vertex cache 415. If the vertex information has not been previously transformed, a transformation module 420 performs the transformation on the vertex information. The transformation module 420 transforms the vertex information from model space into clip space. This transformation is performed using NHCS fixed-point matrix operations as detailed below.

The vertex cache 415 is an important part of the transform and lighting module 345. The vertex cache 415 makes possible the single streamline branched pipeline architecture by providing a location for vertex information and other data to be stored while other module are processing. In addition, the vertex cache 415 provides storage for vertex information and data that has already been processed by a certain module. In at least one embodiment, Direct3D mobile (D3DM) is implemented in the NHCS graphics rendering device 100 and the vertex cache 415 is software implemented into D3DM. On the other hand, traditional Direct3D implementations use hardware to store vertex information. The software-implemented vertex cache 415 saves precious memory and processing power.

A culling module 425 is used to perform culling of the transformed vertex information prior to the information being processed by a lighting module 430. The lighting module is the most computationally intensive module in the transform and lighting module 345, and positioning the culling module 425 before the lighting module 430 eliminates unnecessary (and computationally expensive) processing by the lighting module 430. This placement of the culling module 425 before the lighting module 430 reduces the number of vertex needing to be lit by the lighting module and saves both time and processing power.

The culling module 425 receives as input the transformed vertex information. If the vertex information was transformed as part of the input data 400, this information was stored in the vertex cache 415 and is retrieved by the culling module 425 from the vertex cache 415. On the other hand, if the transformation module 420 performed the transformation, the culling module 425 receives the transformed vertex information directly from the transformation module 420.

As explained in detail below, some vertex may be discarded by the culling module 425 and some vertex may be retained. The vertexes that are retained are processed further by checking the vertex cache 415 to determine whether the vertexes have been previously lit. For vertexes that have been previously lit, they are passed directly to the view frustum clipping module 435. If the vertex is unlit, the vertex is sent to the lighting module 430.

The lighting module 430 computes color for vertex. As discussed below, there are several functions that the lighting module 430 can use to light the vertex. After the vertex is lit, they are sent to a texture generation and transformation module 440. The texture generation and transformation module 440 computes texture coordinates and transforms the coordinates after generation.

It should be noted that the placement of the culling module 425 in the transform and lighting pipeline is important. In D3D, culling is performed after lighting and after texture generation and transformation. In the transform and lighting pipeline of disclosed herein, the culling module 425 is implemented in D3DM and is positioned before the lighting module 430 and before the texture generation and transformation module 440. This placement saves processing power and computational time because the lighting module 430 is the most computationally intensive part of the transform and lighting module 345.

The view frustum clipping module receives data either from the vertex cache 415 or directly from the texture generation and transformation module 440. View frustum clipping is applied to vertex after lighting and texture generation and transformation because it involves interpolation of the color and texture coordinate. The view frustum clipping module 435 is designed for NHCS fixed-point operations and processes the clip space coordinates that have already been lit and had texture generation and transformation applied. The view frustum clipping module 435 works well with both vertex transformed in by the texture generation and transformation module 440 and vertex transformed by an application before entering the transform and lighting module 345.

The data exiting the view frustum module 435 is divided into vertex information and indices. The vertex information is sent to another vertex buffer 445 and the indices are sent to another index buffer 450. The output data of the transform and lighting module 345 is 2D data that can be rendered on a screen or monitor of an embedded device.

V. Operational Overview of Single Streamline Branched T&L Pipeline

Figure 5:
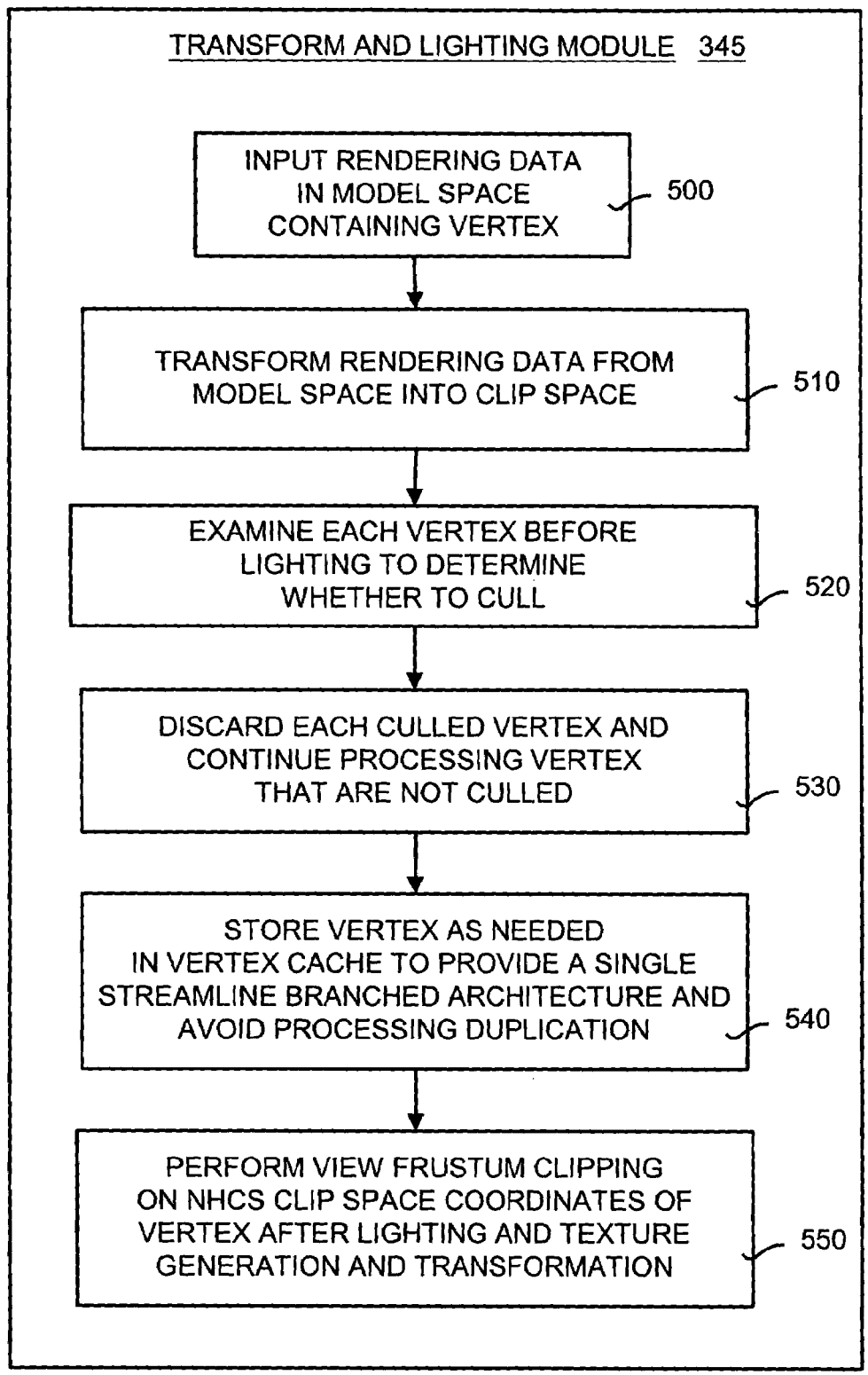
FIG. 5 is a general flow diagram illustrating the operation of the single streamline branched pipeline (or method) of the transform and lighting module shown in FIG. 4.

The transform and lighting module 345 includes a single streamline branched pipeline that is optimized for executing on CPUs of embedded platforms. FIG. 5 is a general flow diagram illustrating the operation of the single streamline branched pipeline (or method) of the transform and lighting module 345 shown in FIG. 4. The pipeline begins by inputting rendering data in model space (box 500). The rendering data contain vertex (or a plurality of vertices). Next, the rendering data is transformed from model space into clip space (box 510). Each vertex then is examined to determine whether that vertex should be culled (box 520). The culling process is described in detail below with reference to the culling module 425.

If a vertex is culled, then it is discarded. Otherwise, processing is continued on the vertexes that are not culled (box 530). Processing includes lighting as well as texture generation and transformation. Throughout the transform and lighting pipeline, a vertex cache is provided to store vertex as needed (box 540). The vertex cache facilitates a single streamline branched architecture of the pipeline. By providing a vertex cache to store data, the pipeline avoids processing duplication. For example, if input rendering data has already been lit, then the lit data can be stored in the vertex cache to avoid processing by the lighting module.

Next, view frustum clipping is performed on normalized homogenous coordinate system (NHCS) clip coordinates of the vertex after lighting and texture generation and transform (box 550). The NHCS fixed-point format allows computations and operations to be performed on the clip coordinates such that a range can be predicted. Any data outside of the range is truncated. This processing of the data in the NHCS fixed-point format allows more efficient use of valuable memory and processing power. The NHCS fixed-point format is described in more detail below.

VI. Operational Details and Working Example

Figure 6:
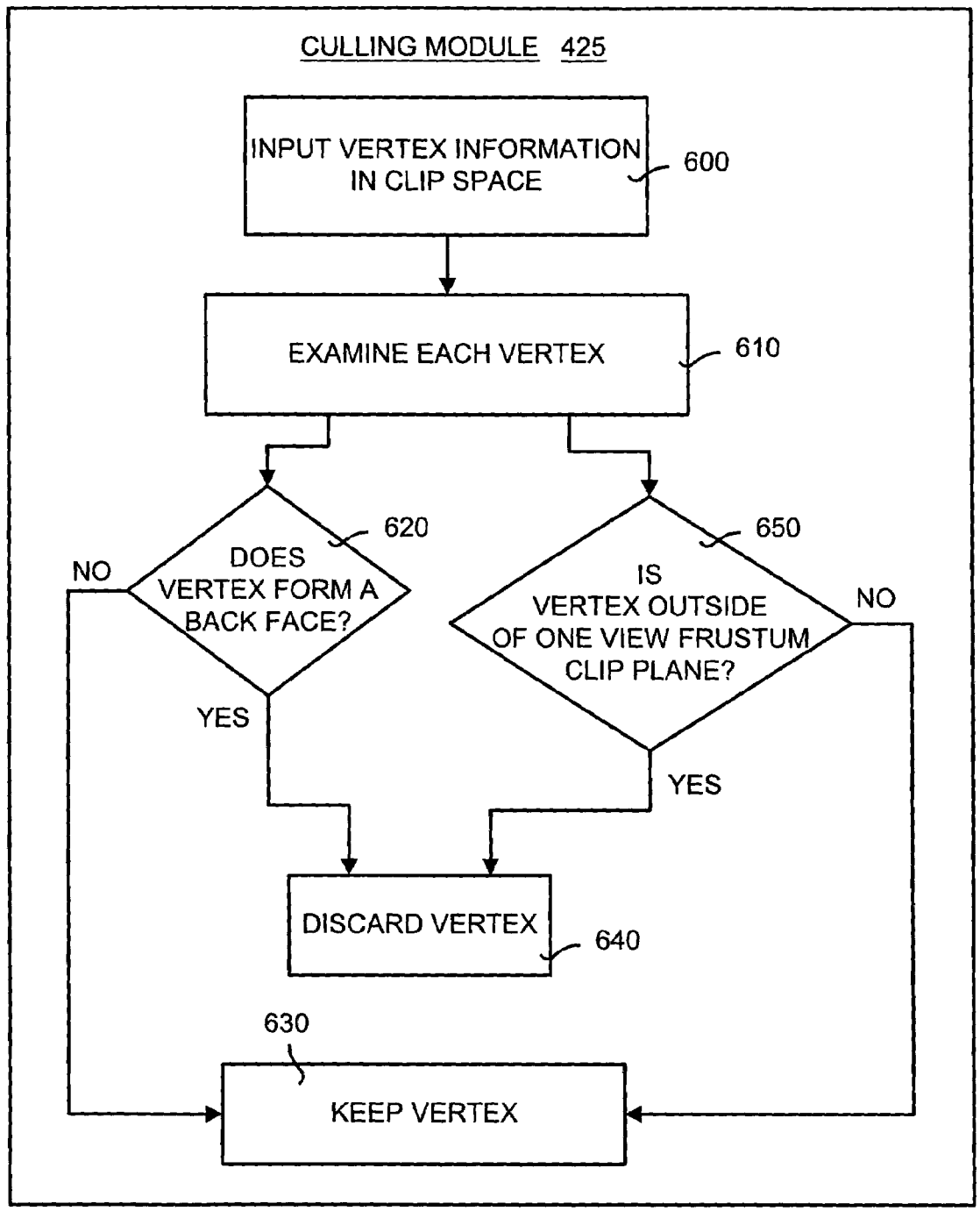
FIG. 6 is a detailed flow diagram illustrating the operation of the culling module shown in FIG. 4.

FIG. 6 is a detailed flow diagram illustrating the operation of the culling module 425 shown in FIG. 4. The culling module 425 is used to perform culling of transformed vertex information before processing by the lighting module 430. The placement of the culling module 425 is important. In the transform and lighting pipeline disclosed herein, the culling module is positioned before the lighting module 430. Since the lighting module is the most computationally intensive module in the transform and lighting module 345, and positioning the culling module 425 before the lighting module 430 increases processing efficiency by reducing the number of vertex processed by the lighting module.

Referring to FIG. 6, the culling process of the culling module 425 begins by inputting vertex information in clip space (box 600). Next, each of the vertex is examined (box 610). One of two types of culling examinations is performed. A first type of culling is a back face culling. Back face culling checks whether the vertex forms a back face of a triangle (box 620). If not, then the vertex being examined is kept (box 630). Otherwise, if the vertex forms the back face of a triangle, then the vertex is discarded (box 640).

A second type of culling is a view frustum culling. View frustum culling checks whether the vertex is outside of one view frustum clip plane (box 650). If not, then the vertex is kept (box 630). On the other hand, if the vertex is outside of one view frustum clip plane, then the vertex is discarded (box 640).

NHCS Fixed-Point Operations

The transform and lighting module and pipeline disclosed herein use a normalized homogenous coordinate system (NHCS) to perform some operations on the rendering data. NHCS is a high-resolution variation of fixed-point number representation. In general, fixed-point representation of numbers is a way to represent a floating-point number using integers. Briefly, representing a number in a floating-point representation means that the decimal does not remain in a fixed position. Instead, the decimal "floats" such that the decimal always appears immediately after the first digit. As discussed above, using a floating point representation on a mobile device may not be possible due to processor and other hardware limitations.

The alternative is to use fixed-point number representation that is executed using integer functions. On mobile, wireless and other embedded platforms, the CPU may not be powerful enough to support floating-point operations and there typically are no coprocessors for accelerating the floating-point operations. Another important issue is that most floating point software routines are quite slow. Fixed-point is a much faster way to handle calculations.

Fixed-point number representation is a way to speed up any program that uses floating point. Typically, some of the bits are use for a whole part of the number and some bits are used for a fractional part. For example, if there are 32 bits available, a 16.16 configuration means that there are 16 bits before the decimal (representing the whole part of the number) and 16 bits after the decimal (representing the fractional part of the number). In this case, the value 65535.999984741211 is the largest possible number for the 16.16 configuration. This is obtained by setting the decimal portion to all 1's (in binary). The value 65535 with 16 bits is obtained for the whole part of the number. If 65535 is divided by 65536, then the value 0.999984741211 is obtained for the fractional part. There are other variants such as 24.8 (24 bits before the decimal and 8 bits after) and 8.24 (8 bits before the decimal and 24 bits after). The configuration type depends on the amount of precision that an application needs.

In an exemplary embodiment of the optimized transform and lighting module and pipeline, Direct3D for mobile devices (D3DM) is used. In order to operate in the D3DM transform and lighting module and pipeline, floating point numbers need to be converted to NHCS fixed-point numbers. Preferably, the conversion is easy as possible (so that the range of the input vertices does not need to be known) while preserving the precision of the data. NHCS fixed-point number representation achieves these objectives.

NHCS is a type of vertex representation. NHCS can eliminate the annoying overflow, and provides a wider data space. For example, without NHCS, the model space vertex coordinates range from $2^{-16} \sim 2^{15}$, assuming that a 16-bit mantissa is used. On the other hand, if NHCS is used, the model space vertex coordinates range from $2^{-31} \sim 2^{31}$. By adopting NHCS it can be seen that both range and precision are greatly increased.

NHCS also makes the conversion from floating-point to fixed-point easy. It is not necessary to know the exact range of the input vertices. NHCS also eliminates the factitious overflow and takes advantage of the full storage of the buffer. Moreover, NHCS has the advantage of providing a wider data representation given the same precision. NHCS also preserves all transform and lighting operations and makes use of the "w" in homogeneous coordinate representation.

Working Example

Figure 7:
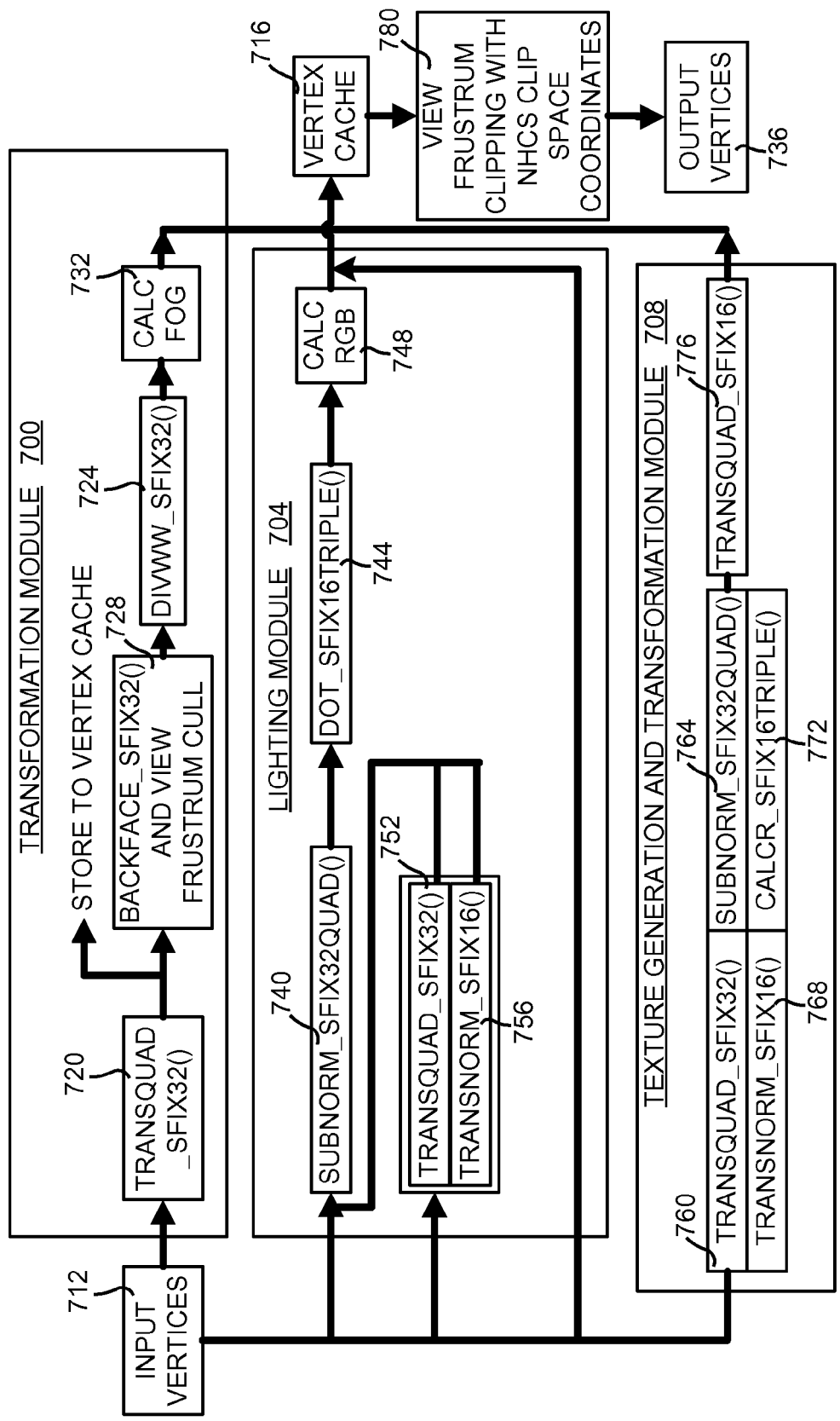
FIG. 7 is a working example of the transform and lighting module and pipeline as is shown for illustrative purposes only.

FIG. 7 is a working example of the transform and lighting module and pipeline as is shown for illustrative purposes only. The transform and lighting module and pipeline shown in FIG. 7 includes a transformation module 700, a lighting module 704 and a texture generation and transformation module 708. It should be noted that the modules 700, 704 and 708 are specific implementations of the modules 420, 430 and 440 shown in FIG. 4. Specifically, in FIG. 7 the transform and lighting module is an implementation of the Direct3D mobile (D3DM) rendering standard for embedded devices.

The transformation module 700 inputs vertices (or vertex) 712. In this working example, a flexible vertex format is supported. This means that the necessary components of the vertex can be selected. The following vertex structures are supported:

```
typedef struct t_FVF {
    BOOL bFog;//Whether Fog component exists. Only for output vertex
    BOOL bDiff; //Whether Diffuse component exists.
    BOOL bSpec;      // Whether Diffuse component exists.
    BOOL bXYZ;       // Whether Coordinate component exists.
    BOOL bNorm; // Whether Normal component exists.
    int nTexNum;     // Number of textures.
    int nTexCoord;   // Number of texture coordinates.
    int nSize;       //total size of a vertex
    //offsets in a vertex
    int offFog;      // Offset of the Fog component.
    int offDiff;     // Offset of the Diffuse component.
    int offSpec; // Offset of the Specular component.
    int offXYZ;      // Offset of the Coordinates component.
    int offNorm; // Offset of the Normal component.
    int offTex;      // Offset of the Texture coordinate component.
} FVF;
```

These structures describe whether a component is in the vertex, and gives its offset for memory access.

The transformation module 700 transforms a vertex from model space to clip space, with a NHCS fixed-point presentation. Before transformation, the pipeline will check a vertex cache 716 to see whether the vertex has been transformed before. If not, then the model space NHCS vertex will be transformed by a matrix, $M_{wvp}$, to a NHCS clip space vertex. The matrices and functions discussed in this working example are discussed in detail below. Next, the transformed data is stored in the vertex cache 716. Some necessary messages are also stored in the vertex cache 716 for later conversion of the NHCS clip space vertex to non-NHCS clip space vertex. In this working example, a delayed conversion of NHCS to non-NHCS was used for at least two reasons. First, the conversion needs division, and can be reduced by back face culling. Second, back face culling be performed on NHCS clip space vertex.

Although the pipeline outputs the clip space vertices, view space vertices are still useful for either lighting in view space or texture coordinate generation. There are two ways to do both the transform: (1) transform vertex from model space to view space by $M_{wv}$, and then transform vertex from view space to clip space by $M_p$; and (2) transform vertex from model space to view space by $M_{wv}$, and transform vertex from model space to clip space by $M_{wvp}$. The second technique was used because when functions like view space lighting and texture coordinate generation were turned off, the bypassing of transform to view space does not affect the pipeline.

As shown in FIG. 7, the transformation module uses the function TransQuad_SFIX32( ) 720. This function transforms model space vertices contained in the input vertices 712 to clip space vertices in an NHCS fixed-point format. The function DivW_SFIX32( ) 724 converts NHCS clip space vertices to non-NHCS clip space vertices. It should be noted that in this working example the culling is part of the transformation module 700. In particular, the functions Backface_SFIX32( ) and View Frustum Cull 728 are used to cull the input vertices 712. The vertex that are culled are discarded and the vertex that pass are sent to the lighting module 704 to be lit. A Calc Fog function 732 is used to perform fogging on the vertex information, if desired.

The lighting module 704 computes color according to lighting parameters for vertices of that are non-backface. An input vertex can be assigned with normal or with diffuse/specular color. However, one or the other must be assigned; both cannot be assigned If a normal is inputted, the lighting is calculated for each vertex using a Phong model. The output contains diffuse color. A render state can be set to indicate whether specular color should be calculated or not. If diffuse/specular color is inputted, the vertex are simply copied to output vertices 736 when light is off. When light is on, the output specular color is set to zero in spite of the input specular color, and the output diffuse color is set to ambient color.

Lighting with normal can be calculated in model space or view space. Lighting in model space is faster but limited to rigid transform from model to world space. In addition, non-rigid transform form world space to view space causes incorrect lighting results. Lighting in view space is less limited. For example, a model-world matrix could be scaled asymmetrically to transform a sphere in model space into an ellipsoid in world space, and lit it correctly in view space, but incorrectly when lit in model space. This occurs because lighting in view space first transforms normal from model space to view space, and thus asymmetry is involved.

The lighting module 704 uses the following functions. The function SumNorm_SFIX32Quad( ) 740 is used to obtain direction by subtracting light/view with vertices. The output is view direction and light direction. This information is input for the function Dot_SFIX16Triple( ) 744, which obtains a dot product of two normalized vectors. The dot product is set to a calculate RGB module 748 where RGB color values are computed. The function TransQuad_SFIX32( ) 752 is used to transform from model space to view space using a NHCS fixed-point format. The output is a position in view space. The function TransNorm_SFIX16( ) 756 is used to transform a normal from model space to view space. The output is a normal in view space. Other functions (not shown) included in the lighting module 704 are a Normalize_SFIX16Triple( ), which normalizes a SFIX16Triple, and a Power_UFIX16( ), which obtains a power for a specular component.

The texture generation and transformation module 708 computes texture coordinates and the coordinate transforms. In texture coordinate generation, view space normal, position or reflection can be used as texture coordinates. It should be noted that some of these coordinates may have already been calculated, and these results can be reused. For this purpose, three flags are set to check whether these items have been computed. These flags involve:

Flag of view space normal

Flag of position

Flag of view direction

Texture transform is conducted after texture coordinate generation.

The texture generation and transformation module 708 uses the following functions. For texture generation, four functions are used. First, TransQuad_SFIX32( ) 760 is used to transform from model space to view space using a NHCS fixed-point format. Second, SubNorm_SFIX32Quad( ) 764 is used to transform a normal from model space to view space. Third, TransNorm_SFIX16( ) 768 is used to obtain direction by subtracting view with vertices. Fourth, CalcR_SFIX16Triple( ) is used to calculate reflection from the view and the normal. The texture coordinate transformation uses the function TransQuad_SFIX16( ) to transform the texture coordinates.

The vertex cache 716 contains the intermediate transform and lighting results for reducing unnecessary re-calculation while rendering a single frame. The vertex cache 716 is reset when rendering of a frame is completed. In this working example, the vertex cache 716 contains 32 vertices. It is defined as
define CACHESIZE 32
Each element in the vertex cache 716 is defined as:

```
typedef struct t_VertexCacheItem {
    UFIX8 flag;
    BYTE* pVtx;
    WORD idxDestVtx;
    int shift;
    SFIX32 w;
    BYTE* pTnlVtx;
    SFIX32Quad cpos;
} VertexCacheItem;
```

Where,
flag contains 6 bits culling flags, 1 bit for transformed and 1 bit for lit.
pVtx points to the original vertex in model space vertex buffer.
idxDestVtx is the index of the vertex in destination vertex buffer. It can be −1 if the vertex is clipping by view frustum.
shift is the shift bits for recover the real w in getting non-NHCS clip space coordinates.
w is the original w in model space vertices. This means that user-T&L vertices are supported in this transform and lighting pipeline.
pTnlVix is the vertex after transform and lighting. It has a structure exactly the same as vertex in destination vertex buffer, and is allocated dynamically when destination vertex FVF changes.
cpos is the NHCS clip space coordinates. Note that there is also a clip space coordinate in pTnlVtx but it is non-NHCS. The reason for keep cpos in cache is that some vertices may failed in back face test, and lit is bypassed. Then cpos is used when the vertices enter with another triangle for back face test again.

When a SrcFixVertex is sent to the pipeline, the cid is first checked in SrcFixVertex to determine whether it is in the cache. If 0<=cid<CACHESIZE, then the pVtx is further checked in the cache item of cid, to determine if it equals the SrcFixVertex. If this check is passed, the vertex is already transformed and lit; an index in index buffer is all that needs to be added to form a new triangle.

There are no math functions in the vertex cache 716. The entire transformed and lit vertices are save in the vertex cache 716. Each vertex corresponds to an input vertex. It is for supporting view frustum clipping, if necessary.

View frustum clipping 780 also is performed in the transform and lighting pipeline. This clipping technique uses NHCS clip space coordinates. The clipping technique works equally well with vertices transformed by the texture generation and transformation module 708 as well as vertices transformed outside of the transform and lighting pipeline by an application. The pipeline outputs vertices 736 that are in 2D screen coordinates.

VII. Details of Data Structure and Mathematical Functions

The following are details of the data structure for the transform and lighting module and pipeline as well as mathematical functions used in the pipeline.

Data Structure for Transform & Lighting

The data structure definition for the NHCS fixed-point format is shown in the following tables:

Basic Type

| | |
|---|---|
| SFIX64: | signed 64-bit integer |
| UFIX64: | unsigned 64-bit integer |
| SFIX32: | signed 32-bit integer |
| UFIX32: | unsigned 32-bit integer |
| SFIX16: | signed 16-bit integer |
| UFIX16: | unsigned 16-bit integer |
| SFIX8: | signed 8-bit integer |
| UFIX8: | signed 8-bit integer |

Structure Type

| | | |
|---|---|---|
| typedef | SFIX64 | SFIX64Quad[4] |

This data structure is used to store a 4-element vector, and each element is a 64-bit signed integer. This vector can be either NHCS or non-NHCS.

| | | |
|---|---|---|
| typedef | SFIX64 | SFIX64Triple[3] |

This data structure is used to store a 3-element vector, and each element is a 64-bit signed integer. This vector can be either NHCS or non-NHCS.

| | | |
|---|---|---|
| typedef | SFIX32 | SFIX32Quad[4] |

This data structure is used to store a 4-element vector, and each element is a 32-bit signed integer. This vector can be either NHCS or non-NHCS.

| | | |
|---|---|---|
| typedef | SFIX32 | SFIX32Triple[3] |

This data structure is used to store a 3-element vector, and each element is a 32-bit signed integer. This vector can be either NHCS or non-NHCS.

| | | |
|---|---|---|
| typedef | SFIX16 | SFIX16Quad[4] |

This data structure is used to store a 4-element vector, and each element is a 16-bit signed integer. This vector can be either NHCS or non-NHCS.

| | | |
|---|---|---|
| typedef | SFIX16 | SFIX16Triple[3] |

This data structure is used to store a 3-element vector, and each element is a 16-bit signed integer. This vector can be either NHCS or non-NHCS.

| | | |
|---|---|---|
| typedef | UFIX8 | UFIX8Quad[4] |

This data structure is used to store a 4-element vector, and each element is an 8-bit unsigned integer. This vector is non-NHCS. This vector is used mainly for representing color RGBA components.

| typedef | SFIX32Mat4x4 | SFIX32[16]; |
|---|---|---|

This data structure is used to store a 16-element matrix, which is 4 by 4. Each element of the matrix is a 32-bit unsigned integer. This matrix can be either NHCS or non-NHCS.

Default Mantissa Bits

The default mantissa bits listed here are for fixed-point data representation:

| #define DEFAULT_SFIX32 | 16 | //default mantissa bits for 32-bit signed |
|---|---|---|
| #define ONE_SFIX32 | 30 | //mantissa bits for 32-bit signed with (−1~1) |
| #define NORMAL_SFIX16 | 14 | //normal mantissa bits for 16-bit signed |
| #define TEXTURE_SFIX16 | 12 | //mantissa bits for 16-bit texture coordinate |
| #define ONE_UFIX16 | 15 | //mantissa bits for 16-bit unsigned within (0~1) |
| #define COLOR_UFIX16 | 8 | //color mantissa bits for 16-bit unsigned |

Constant

The constants listed here are for integer shifting during computation and conversion between different data formats:

| const SFIX32 | SFIX32_1 = (SFIX32)1<<DEFAULT_SFIX32; |
|---|---|
| const SFIX32 | ONE_SFIX32_1=(SFIX32)1<<ONE_SFIX32; |
| const SFIX16 | NORMAL_SFIX16_1= (SFIX16)1<<NORMAL_SFIX16; |
| const int | POSTOTEX=ONE_SFIX32− TEXTURE_SFIX16; |
| const int | NORMTOTEX= NORMAL_SFIX16 − TEXTURE_SFIX16; |

The basic operations have the following data structure definition:

Type Convert

The following macros are conversion macros for converting between different data formats:

| #define PosToTex(a) | ((SFIX16)((a)>>POSTOTEX)) |
|---|---|
| #define NormToTex(a) | ((SFIX16)((a)>>NORMTOTEX)) |
| #define FloatToSFIX32(a,n) | ((SFIX32)((a)*((SFIX32)1<<(n))) ) |
| #define SFIX32ToFloat(a,n) | ((float)(a)/((SFIX32)1<<(n))) |
| #define FloatToSFIX16(a,n) | ((SFIX16)((a)*((SFIX16)1<<(n)))) |
| #define FloatToUFIX16(a,n) | ((UFIX16)((a)*((UFIX16)1<<(n)))) |
| #define SFIX16ToFloat(a,n) | ((float)(a)/((SFIX16)1<<(n))) |
| #define FloatToUFIX8(a) | ((UFIX8)((a)*255)) |

Operations

The following macros are computation macros for computing between fixed-point data:

| #define Mul_SFIX32(a,b,n) | ( (SFIX32)(((SFIX64)(a)*(b))>>(n)) ) |
|---|---|
| #define Mul_UFIX32(a,b,n) | ( (UFIX32)(((UFIX64)(a)*(b))>>(n)) ) |
| #define Div_SFIX32(a,b,n) | ( (SFIX32)(((SFIX64)(a)<<(n))/(b)) ) |
| #define Mul_SFIX16(a,b,n) | ( (SFIX16)(((SFIX32)(a)*(b))>>(n)) ) |
| #define Mul_UFIX16(a,b,n) | ( (UFIX16)(((UFIX32)(a)*(b))>>(n)) ) |
| #define Mul_UFIX8(a,b,n) | ( ((UFIX16)(a)*(b))>>(n) ) |

The data structure definition for the different types of data are as follows:

Input Data

| Name | Type | Mantissa bits |
|---|---|---|
| Model space vertex coordinates | SFIX32Quad | NHCS |
| Model space normal | SFIX16Triple | NORMAL_SFIX16 |
| Model space texture coordinates | SFIX16 | TEXTURE_SFIX16 |
| Model space diffuse/specular color | DWORD with A8R8G8B8 | |
| Vertex/Texture transform matrices | SFIX32Mat4x4 | DEFAULT_SFIX32 |
| Light/view vectors for lighting | SFIX32Quad | NHCS |
| Fog parameters | SFIX32 | DEFAULT_SFIX32 |
| Color in light/material | UFIX8Quad | 0 |
| Power in material | UFIX8 | 0 |

Output Data

| Name | Type | Mantissa bits |
|---|---|---|
| Transformed vertex coordinates (x, y, z) | SFIX32 | ONE_SFIX32 |
| Transformed vertex coordinates (w) | SFIX32 | DEFAULT_SFIX32 |
| Color | DWORD with A8R8G8B8 | |
| Texture coordinates | SFIX16 | TEXTURE_SFIX16 |
| Fog | SFIX32 | DEFAULT_SFIX32 |

Intermediate data's type and mantissa bits are listed within each function.

Details of each of the above data types is listed below. The reason why such data types and the mantissa bits were chosen are explained.

Lighting

Position/Direction

Light position or direction is taken as

| Light position | SFIX32Quad, | NHCS |
|---|---|---|

This representation provides the enough range and precision for lighting, and no extra cost exists comparing with the traditional representation such as non-NHCS.

Viewpoint

Viewpoint is represented as:

| Viewpoint | SFIX32Quad, | NHCS |
|---|---|---|

This representation provides enough range and precision for lighting, and no extra cost exists comparing with the traditional representation such as non-NHCS.

Lighting Color

Lighting color includes:
Ambient.
Diffuse
Specular

Their representation is:

| Lighting color | UFIX8Quad | No mantissa |
|---|---|---|

This presentation is a natural expansion of color in D3D in A8R8G8B8 style.

Material Property

Material color includes:
Ambient.
Diffuse
Specular

Each of them is represented as:

| Material color | UFIX8Quad | No mantissa |
|---|---|---|

This presentation is a natural expansion of color in D3D In A8R8G8B8 style. The power component is represented as:

| Power component | UFIX8 | No mantissa |
|---|---|---|

In one embodiment of the NHCS graphics rendering system 100, the power is assumed to be an integer from 0 to 127.

Normal

Normal is taken as:

| Normal | SFIX16 | NORMAL_SFIX16 mantissa |
|---|---|---|

From empirical evidence, it is concluded that a 16-bit normal is enough for rendering a Microsoft® Windows CE® device window. In a preferred embodiment, the NORMAL_SFIX16 is equal to 14. Moreover, the 1 sign bit must be preserved and 1 additional bit should be preserved as integer part for normal coordinates like 1.0 or −1.0.

Texture Coordinate

Texture coordinate is represented as:

| Texture coordinate | SFIX16 | TEXTURE_SFIX16 mantissa |
|---|---|---|

In a preferred embodiment, the TEXTURE_SFIX16 is equal to 12. Further, there is 1 bit for sign and 3 bits for an integer part. This provides supports for finite filing (−8~8), and gives 4-bits sub-pixel resolution for a texture as large as (256×256). Note that there is a trade off between the tilting size and sub-pixel resolution.

Output Vertex Coordinate

The NHCS graphics rendering system 100 produces an output vertex suitable for a vertex shader. The representation is:

| x | SFIX32 | ONE_SFIX32 mantissa |
|---|---|---|
| y | SFIX32 | ONE_SFIX32 mantissa |
| z | SFIX32 | ONE_SFIX32 mantissa |
| w | SFIX32 | DEFAULT_SFIX32 mantissa |

When a vertex is within a view frustum, the value for x, y will be within (−1, 1), and z in (0~1). A vertex outside the view frustum will be clipped before output. That is why ONE_SFIX32 is given as 30 and does not suffer from overflow. The w component is not normalized in (−1~1). A 16-bit fraction and a 15-bit integer is a good balance between the precision and range of w.

Matrices

Prior to rendering, several matrices should be ready. All matrices are of the data structure SFIX32, with DEFAULT_SFIX32 bits mantissa.

Model Space to World Space $M_w$: Transform matrix from model space to world space.
Currently, a D3DM implementation assumes that the last column of this matrix is $(0, 0, 0, 1)^T$. No error is returned, and if a user specifies a matrix with different last column texture coordinate and fog it will be incorrect.

World Space to View Space $M_v$: Transform matrix from world space to view space
Currently, a D3DM implementation assumes that the last column of this matrix is $(0, 0, 0, 1)^T$. No error is returned, and if user specifies a matrix with different last column texture coordinate and fog it will be incorrect.

View Space to Clip Space $M_p$: Projection matrix from view space to clip space
Currently, a D3DM implementation assumes that the last column of this matrix is $(0, 0, 1, 0)^T$ or $(0, 0, a, 0)^T$. No error is returned. For correct fog, the last column should be $(0, 0, 1, 0)^T$ to give a correct w value. This is called the W-friendly projection matrix.

Model Space to View Space $M_{wv}$: Matrix combination from model space to view space $$M_{wv}=M_w M_v$$

A D3DM implementation combines the matrices $M_w$ and $M_v$ and the last column of this matrix is $(0, 0, 0, 1)^T$. No error is returned. If user specifies a matrix with different last column texture coordinate and fog it will be incorrect.

Model Space to Clip Space $M_{wvp}$: Matrix combination from model space to clip space $$M_{wvp}=M_w M_v M_p$$

A D3DM implementation combines the matrices $M_w$, $M_v$ and $M_p$. The last column of this matrix is determined by the parameters of these matrices. No error is returned.

Mathematical Library

The mathematical library includes mathematical operations and graphics functions. The mathematical library now will be discussed in detail.

Feature Division

The features of the mathematical library are divided into features that are supported by the rasterizer, resource management, and features supported by transform and lighting (T&L). The mathematical library implements all features supported by T&L.

Features Supported in the Rasterizer

The following features are features in the mathematical library that are supported by the rasterizer:
- Point, line list, line strip, tri list, tri strip and tri fan rendering
- Point, wireframe, solid fill
- Flat and Gouraud shading
- Depth test with various compare mode and pixel rejection
- Stencil compare and pixel rejection
- Depth buffer-less rendering is supported as well
- W buffer support
- MipMap textures are supported (Interpolate)
- 8 stage multi-texture with D3D8 fixed function blending options
- Point, linear, anisotropic, cubic and Gaussian cubic texture filtering
- Alpha blending (with several bland modes)
- Palletized textures
- Perspective correct texturing (not on by default)
- Color channel masking (COLORWRITEENABLE)
- Dithering
- Multisampling for FSAA
- Texture address modes

Features Supported in Resource Management

Resources are objects that are resident in memory, such as textures, vertex buffers, index buffers and render surfaces. Resource management is the management of the various memory operations on these objects. These operations include allocation, copying, moving, locking for exclusive usage, unlock and de-allocation. The following features are features in the mathematical library that are supported in resource management:

- Swap chain creation and management for display
- Depth/stencil buffer creation and management
- Vertex buffer creation and management
- Index buffer creation and management
- Texture map creation and management
- Many texture formats including DXT compressed texture
- Scratch surface creation/management for texture upload
- MipMap textures are supported (Build)
- Dirty rectangular texture update mechanism
- All buffers lockable (assuming driver support!)

Features Supported in T&L

The following features are features in the mathematical library that are supported by in T&L:
- Texture coordinate generation
- View, projection and world transform matrices
- Single transform matrix per texture coordinate set (8 sets max)
- Up to 4 dimensions per texture coordinate set
- Ambient/diffuse/specular lighting and materials
- Directional and point lights
- Back face culling
- Fog (depth and table based)

Math Functions Indexed by Features

In this section, the mathematical functions indexed by features are described. The functions cover transform, culling, lighting, culling, texture and other miscellaneous functions. In addition, the overflow and underflow (resolution loss) problems of these functions are discussed.

Transform Functions

| NHCS vector transform |
| --- |
| int TransQuad__SFIX32(SFIX32Quad b, SFIX32Mat4x4 m, SFIX32Quad c) |
| This function transforms a 32-bits NHCS vector b to another 32-bits NHCS vector c by matrix m. |
| Parameters    b, <br>                 Input vector in SFIX32Quad in NHCS format <br>                 m <br>                 Transform matrix in SFIX32Mat4x4 and DEFAULT_SFIX32 format. <br>                 c, <br>                 Output vector after transform in SFIX32 format in NHCS representation. |
| Return value    An integer indicates the shift bits in converting intermediate 64-bits c to 32-bits NHCS c. |
| Remarks    Overflow: <br> The maximum possible intermediate value is: 4*(0x8000 0000*0x8000 0000) = 0x 1 0000 0000 0000 0000. This indicates that a 64-bits intermediate value will have overflow in the intermediate data before NHCS. <br> Underflow: <br> Appears when truncated from intermediate buffer. |

| Matrix combination |
| --- | void MatMul4x4__SFIX32(SFIX32Mat4x4 m1, SFIX32Mat4x4 m2, SFIX32Mat4x4 m3, UFIX8 n)
This function combines two 32-bits 4 × 4 matrices to another 32-bits 4 × 4 matrix

| | |
| --- | --- |
| Parameters | m1, m2<br>Input matrices in SFIX32Mat4x4<br>n<br>Input shift bits for shifting the 64-bits multiplication results to 32-bits results.<br>m3,<br>Output combined matrix. |
| Return value | No return value |
| Remarks | Shift<br>The matrices m1, m2, m3 can have different mantissa bits. Suppose m1 with a bits mantissa and m2 with b bits mantissa, to get a c-bits mantissa m3, we should set n = (a + b) − c<br>Overflow:<br>The maximum possible intermediate value is: 4*(0x8000 0000*0x8000 0000) = 0x 1 0000 0000 0000 0000. This indicates that a 64-bits intermediate value will have overflow in the intermediate data. When truncating the 64-bits intermediate result to 32-bits output, overflow is also possible.<br>Underflow:<br>Appears when truncated from intermediate buffer. |

| Non-NHCS vector transform |
| --- | void TransQuad__SFIX16(SFIX16Quad b, SFIX32Mat4x4 m, SFIX16Quad c)
This function transforms a 16-bits vector to a 16-bits vector.

| | |
| --- | --- |
| Parameters | b,<br>Input vector in SFIX16Quad with TEXTURE__SFIX16 bits mantissa.<br>m<br>Transform matrix in SFIX32Mat4x4 and DEFAULT__SFIX32 format.<br>c<br>Output vector after transform in SFIX16 format with TEXTURE__SFIX16 bits mantissa. |
| Return Value | No return value. |
| Remarks | Overflow:<br>Appears when go out range of TEXTURE__SFIX16 mantissa.<br>Underflow:<br>Appears when go out range of TEXTURE__SFIX16 mantissa. | void TransNorm__SFIX16(SFIX16Triple b,SFIX32Mat4x4 m, SFIX16Triple c)
This function transforms a 16-bit normal to a 16-bits normal.

| | |
| --- | --- |
| Parameters | b<br>Input vector in SFIX16Triple with NORAML__SFIX16 bits mantissa.<br>m<br>Transform matrix in SFIX32Mat4x4 and DEFAULT__SFIX32 format.<br>c<br>Output vector after transform, it is in SFIX16 format with NORMAL__SFIX16 bits mantissa, normalized. |
| Return value | No return value. |
| Remarks | Matrix<br>For transform normal, only the upper 3 × 3 part of m is used.<br>Normalization:<br>The output is normalized by Normalize__SFIX16Triple( ) |

| NHCS to non-NHCS convert |
| --- |

Void DivWW__SFIX32(SFIX32 w, int shift, SFIX32Quad c, SFIX32Quad cc)
This function transforms a NHCS vertex to clip space non-NHCS vertex.

| | |
| --- | --- |
| Parameters | w<br>Input w to be divided from the NHCS vertex, SFIX32. It is the b[3] in TransQuad__SFIX32( ).<br>shift<br>Input shifted bits return from TransQuad__SFIX32( ). For calculating the correct w<br>c<br>Input vertex after TransQuad__SFIX32( ), NHCS<br>cc<br>Output vertex with non-NHCS SFIX32 format. cc[0]~cc[2] has ONE__SFIX32 bits mantissa, and cc[3] has DEFAULT__SFIX32 bits mantissa. |
| Return value | No Return value |
| Remarks | This function is related to TransQuad__SFIX32( ). With this function we get the actual clip space vertex from NHCS clip space vertex for finally converting to float point vertex and output to vertex shader. |

Void DivW__SFIX32(SFIX32 w, int shift, SFIX32Quad c, SFIX32Quad cc)
This function transforms a NHCS vertex to clip space non-NHCS vert x.

| | |
| --- | --- |
| Parameters | w<br>Input w to be divided from the NHCS vertex, SFIX32. It is the b[3] in TransQuad__SFIX32( ).<br>shift<br>Input shifted bits return from TransQuad__SFIX32( ). For calculating the correct w<br>c<br>Input vertex after TransQuad__SFIX32( ), NHCS<br>cc |

-continued

| | |
|---|---|
| Return value | Output vertex with DEFAULT_SFIX32 format. No Return value |
| Remarks | This function is related to TransQuad_SFIX32( ). This function is used in texture coordinate generation from view space position, so the precision and range is different from DivWW_SFIX32 above. |

Culling Functions

| Backface testing | |
|---|---|
| BOOL Backface_SFIX32(SFIX32* a, SFIX32* b, SFIX32* c, BOOL bCCW) | |
| This function checks if the triangle (a, b, c) is a back face. | |
| Parameters | a, b, c 3 sequential vertex of an triangle, they are in SFIX32Quad with NHCS representation bCCW Face orientation, TRUE for CCW, FALSE for CW |
| Return value | BOOL, TRUE for back face, FALSE for non-back face. |
| Remarks | There is a sequential multiplication of 3 operands. NHCS is used to compress the operand from 32-bits to 16-bits since we only need the sign. |

View Frustum Culling

View frustum culling removes the triangles whose vertices are outside of one view frustum plane. View frustum involves 6 planes:
Left plane.
Right plane.
Top plane.
Bottom plane.
Near plane
Far plane.

Figure 8:
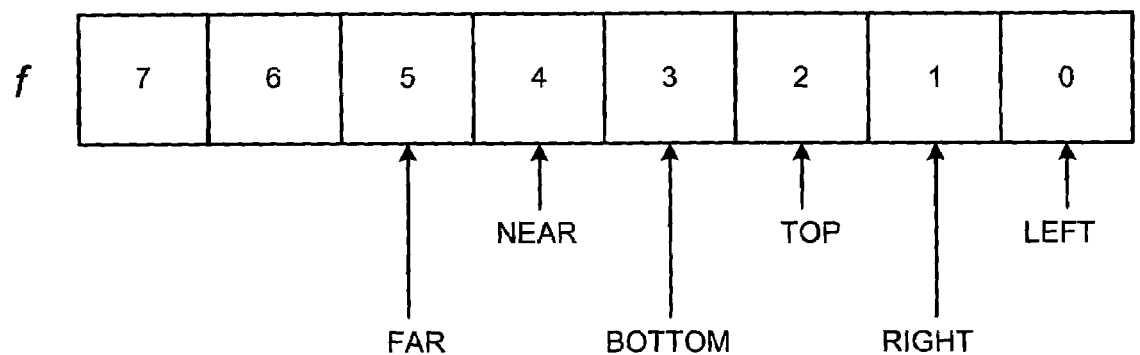
FIG. 8 illustrates an exemplary implementation of a buffer to store culling planes.

A UFIX8 is set to hold 6 flags for culling. FIG. 8 illustrates an exemplary implementation of a buffer to store culling planes. In particular, FIG. 8 shows an UFIX8 format buffer to store the culling planes. View frustum culling is performed in clip space. If it is assumed that b is a NHCS coordinate in the clip space, the algorithm is:

```
SFIX32Quad b; // NHCS clip space coordinates
UFIX8 f=0;
if (b[0]<-b[3])
    f |= 0x01;
else if (b[0]> b[3])
    f |= 0x02;
if (b[1]<- b[3])
    f |= 0x04;
else if (b[1]> b[3])
    f |= 0x08;
if (b[2]<0)
```

-continued

```
    f |= 0x10;
else if (b[2]> b[3])
    f |= 0x20;
```

If three flags for each vertex are obtained, an "AND" operation can be used to test whether the flags are outside of the same plane.

The flag is also useful in the vertex cache, and the 2 unused bits will indicate:
  Transformed status (indicates whether a vertex has been transformed)
  Lit status (indicates whether a vertex has been lit).

Lighting Functions

The direct3D for mobile supports both directional light and point light. The lighting model used is the Phong model for vertices. Lighting is done in model space. A material should be assigned to the object, and the ambient, diffuse, specular, power property is denoted as $M_{Ambient}$, $M_{Diffuse}$, $M_{Specular}$ and $M_{Power}$ respectively. In D3D, $M_{Ambient}$, $M_{Diffuse}$, $M_{Specular}$ are defined as (r, g, b, a), and each component is a float within [0~1].

Each component only need be represented as:

| Lighting component | UFIX8 | 8 bits mantissa |
|---|---|---|

The color of lighting is noted as $L_{Ambient}$, $L_{Diffuse}$ and $L_{Specular}$. Given normalized vectors N, L and V, which represent vertex normal, vertex-light direction and vertex-view direction respectively, the color of a vertex can be calculated as:

$$C = L_{Ambient} M_{Ambient} + L_{Diffuse} M_{Diffuse}(N \cdot L) + L_{Specular} M_{Specular}(N \cdot H)^{M_{Power}}$$

Figure 9A:
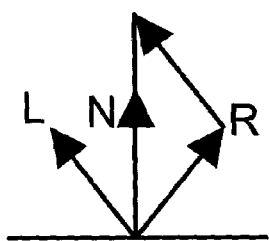
FIGS. 9A and 9B illustrate an exemplary implementation of normalized vectors in a D3DM Phong Model.
Figure 9B:
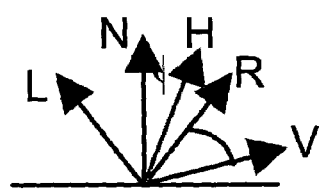

FIGS. 9A and 9B illustrate an exemplary implementation of normalized vectors in a D3DM Phong Model. As shown in FIG. 9A, L is the vector from vertex to light, and N is the vertex normal. R is the reflection direction of light, which is symmetric to L by N. As shown in FIG. 9B, V is the vector from vertex to view point, and H is the half vector of L+V.

All the vectors are transformed to the same space for "dot product" computation, and are normalized for calculation. In this implementation, the model space for saving the transformation of each vertex normal to view space was chosen. However, this choice also brings problems if the model transform contains shears and scaling. Although lighting in model space is discussed here, it is easy to extend the discussion to other spaces. Both lit in model space and lit in view space are supported in the rendering pipeline of the NHCS graphics rendering system.

| Invert Length of a Normal | |
|---|---|
| SFIX32 TripleInvLen(SFIX16Triple a) | |
| This function gives the invert length of a SFIX16Triple, which is useful in normalize | |
| Parameters | a Un-normalized input in SFIX16 in NHCS |
| Return value | Invert length in SFIX32 |
| Remarks | Assume a is a n-bits mantissa, the result is of 42 − n bits |

| Invert Length of a Normal |
|---|
| mantissa. It does not matter if 42 − n > 32, because the calculation does not use n explicitly. Newton's iteration method is used here for solving the invert square root, using a 256-item lookup table. |

| NHCS Vector Normalization |
|---|
| Void Normalize_SFIX16Triple(SFIX16Triple a, SFIX16Triple b) This function normalizes a NHCS SFIX16Triple. |
| Parameters     a     Un-normalized input in SFIX16 in NHCS |
|     b     Normalized output in SFIX16 format with NORMAL_SFIX16 mantissa |
| Return value     No return value |
| Remarks     We use SFIX32 to hold the intermediate TripleInvLen ( ) result to prevent overflow and keep precision. |

| Negative Normalization of NHCS Vector |
|---|
| Void NagNormalize_SFIX16Triple(SFIX16Triple a, SFIX16Triple b) This function gives a negative result to Normalize_SFIX16Triple |
| Parameters     A     Un-normalized input in SFIX16 in NHCS |
|     b     Normalized output in SFIX16 format with NORMAL_SFIX16 mantissa |
| Return value     No return value |
| Remarks     We use SFIX32 to hold the intermediate TripleInvLen ( ) result to prevent overflow. It is used in normalization of directional light. Gives a normal L from vertex to lighting source. |

| Subtraction of Two NHCS Vectors |
|---|
| Void SubNorm_SFIX32Quad (SFIX32Quad a, SFIX32Quad b, SFIX16Triple c) This function calculates normal from subtraction of two NHCS vectors. |
| Parameters     a, b     Input vectors in SFIX32 with NHCS format |
|     c     Normalized (a − b) in SFIX16 with NORMAL_SFIX16 bits mantissa |
| Return value     No return value |
| Remarks     It is used in normalization of view direction V and light direction L when using point light. |

| Dot Production of Two Normalized Vectors |
|---|
| UFIX16 Dot_SFIX16Triple(SFIX16Triple a, SFIX16Triple b) This function returns the dot product of two normalized vector |
| Parameters     a, b     Normalized input in SFIX16 with DEFAULT_SFIX16 bits mantissa. |
| Return value     Dot product with ONE_UFIX16 bits mantissa |
| Remarks     If the two vectors are normalized, there will no overflow at all because the result will be within (0~1). Value that less than 0 is clamped to 0. |

| Power |
|---|
| UFIX16 Power_UFIX16 (UFIX16 a, UFIX8 n) This function returns the power(a, n) |
| Parameters     a     Power base with ONE_UFIX16 bits mantissa. |
|     n     Power exponential within 0~127 |
| Return value     Power value with UFIX16 format |
| Remarks     We use the efficient digit of n to determine how much multiply we need. In rendering pipeline the n can be fixed. We use static variables to store the n and its efficient digit. If n is the same in the consequential calling, the efficient digit will be same as previous one instead of calculated again. |

Half Vector

The half vector is used to approximate the actual cos θ=(V·R) by cos ψ=(N·H) for calculating the specular component. H can be calculated by the normalized L and V:

$$H = \frac{L+V}{|L+V|}$$

L and V are represented by SFIX16Triple with NORMAL_SFIX16 bits mantissa. To avoid overflow and keep precision, they are first added together as a SFIX32Triple. Next, the half vector H is made in NHCS SFIX16Triple, and H then is normalized.

Texture Coordinate Generation

Texture coordinate generation uses view space normal/position/reflection to generate the texture coordinates in each vertex. View space normal and position is available after lighting in view space. However, reflection vectors need to be calculated here.

| Reflection Vector from Normal and View |  |
| --- | --- |
| Void CalcR__SFIX16Triple(SFIX16Triple norm, SFIX16Triple view, SFIX16Triple reflect) |  |
| This function calculates reflection vector from normal and view |  |
| Parameters | Norm |
|  | normalized normal in |
|  | SFIX16, NORMAL__SFIX16 |
|  | view |
|  | normalized view direction |
|  | in SFIX16, NORMAL__SFIX16 |
|  | reflect |
|  | Normalized output in SFIX16 |
|  | format with NORMAL__SFIX16 |
|  | mantissa |
| Return value | No return value |
| Remarks | R = 2(N · V)N − V |

NHCS Clip Space Coordinates Clipping Algorithm

The model-view transform and view-projective transform can be combined into a 4×4 matrix $P_{4\times 4}$:

$$(x \quad y \quad z \quad 1)P_{4\times 4} = \left( \frac{x_p}{w_p}w_p \quad \frac{y_p}{w_p}w_p \quad \frac{z_p}{w_p}w_p \quad w_p \right) \quad (1)$$

The term $$\frac{x_p}{w_p} = x_w$$

is defined, and is similar to y, z. In fact, the term is the normalized screen space coordinates. This assumes the correct wp is obtained for each vertex. Multiplying (1) by $$\left( \frac{1}{w_p} P_{4\times 4}^{-1} \right),$$

yields:

$$\left( \frac{x}{w_p} \quad \frac{y}{w_p} \quad \frac{z}{w_p} \quad \frac{1}{w_p} \right) = (x_w \quad y_w \quad z_w \quad 1)P_{4\times 4}^{-1} \quad (2)$$

Equation (2) is a linear equation, which indicates that 1/wp can be linearly interpolated. Given three vertices and three texture coordinates: $(x_i \; y_i \; z_i \; 1)$ and $(u_i \; v_i \; 1)$ (i=1, 2, 3) for a triangle, there exists an affine transform which maps texture coordinates to object space, if the triangle is not degenerated:

$$(uv1)A_{3\times 4} = (xyz1) \quad (3)$$

Combining (3) and (1), both sides are divided by the wp, and thus:

$$\left( \frac{u}{w_p} \quad \frac{v}{w_p} \quad \frac{1}{w_p} \right)B = (x_w \quad y_w \quad z_w \quad 1) \quad (4)$$

Where $B = A_{3\times 4}P_{4\times 4}$

Equation (4) indicates u/wp, v/wp can be interpolated linearly. For perspective-correct texture mapping, after linearly interpolating u/wp, v/wp and 1/wp, the correct texture coordinates can be computed for projective-correct texture mapping.

The algorithm for interpolating between two points is:

Input: $\text{point}(x_{1p}y_{1p}z_{1p}w_{1p})(x_{2p}y_{2p}z_{2p}w_{2p})$,

Clip plane $ax_w + by_w + cz_w + d = 0$

The intersection point $(x_p \; y_p \; z_p \; w_p)$ will satisfy:

$$\begin{cases} x_w = x_p/w_p = x_{1p}/w_{1p} + (x_{2p}/w_{2p} - x_{1p}/w_{1p})t = x_{1w} + (x_{2w} - x_{1w})t \\ y_w = y_p/w_p = y_{1p}/w_{1p} + (y_{2p}/w_{2p} - y_{1p}/w_{1p})t = y_{1w} + (y_{2w} - y_{1w})t \\ z_w = z_p/w_p = z_{1p}/w_{1p} + (z_{2p}/w_{2p} - z_{1p}/w_{1p})t = z_{1w} + (z_{2w} - z_{1w})t \\ 1/w_p = 1/w_{1p} + (1/w_{2p} - 1/w_{1p})t \end{cases}$$

Take into clip plane, yields:

$$ax_{1w} + by_{1w} + cz_{1w} + d + (a(x_{2w} - x_{1w}) + b(y_{2w} - y_{1w}) + c(z_{2w} - z_{1w}))t = 0$$

$$t = \frac{-w_{2p}(ax_{1p} + by_{1p} + cz_{1p} + dw_{1p})}{w_{1p}(ax_{2p} + by_{2p} + cz_{2p}) - w_{2p}(ax_{1p} + by_{1p} + cz_{1p})}$$

Then:

$$\begin{aligned} 1/w_p &= 1/w_{1p} + (1/w_{2p} - 1/w_{1p})t \\ &= \frac{1}{w_{1p}} + \frac{-(w_{1p} - w_{2p})(ax_{1p} + by_{1p} + cz_{1p} + dw_{1p})}{w_{1p}(w_{1p}(ax_{2p} + by_{2p} + cz_{2p}) - w_{2p}(ax_{1p} + by_{1p} + cz_{1p}))} \\ &= \frac{w_{1p}(ax_{2p} + by_{2p} + cz_{2p}) - w_{2p}(ax_{1p} + by_{1p} + cz_{1p}) -}{w_{1p}(w_{1p}(ax_{2p} + by_{2p} + cz_{2p}) - w_{2p}(ax_{1p} + by_{1p} + cz_{1p}))} \\ &\quad \frac{(w_{1p} - w_{2p})(ax_{1p} + by_{1p} + cz_{1p} + dw_{1p})}{} \\ &= \frac{a(x_{2p} - x_{1p}) + b(y_{2p} - y_{1p}) + c(z_{2p} - z_{1p}) + d(w_{2p} - w_{1p})}{w_{1p}(ax_{2p} + by_{2p} + cz_{2p}) - w_{2p}(ax_{1p} + by_{1p} + cz_{1p})} \end{aligned}$$

And, $$x_w = \frac{b(x_{1p}y_{2p} - x_{2p}y_{1p}) + c(x_{1p}z_{2p} - x_{2p}z_{1p}) +}{w_{1p}(ax_{2p} + by_{2p} + cz_{2p}) - w_{2p}(ax_{1p} + by_{1p} + cz_{1p})}$$

$$y_w = \frac{a(y_{1p}x_{2p} - y_{2p}x_{1p}) + c(y_{1p}z_{2p} - y_{2p}z_{1p}) +}{w_{1p}(ax_{2p} + by_{2p} + cz_{2p}) - w_{2p}(ax_{1p} + by_{1p} + cz_{1p})}$$

$$z_w = \frac{a(z_{1p}x_{2p} - z_{2p}x_{1p}) + b(z_{1p}y_{2p} - z_{2p}y_{1p}) +}{w_{1p}(ax_{2p} + by_{2p} + cz_{2p}) - w_{2p}(ax_{1p} + by_{1p} + cz_{1p})}$$

After NHCS transform, gives:

$$(x_{np}, y_{np}, z_{np}, w_{np}) = c_w, c_v, c_p, w_{nm}(x_p, y_p, z_p, w_p)$$

which gives:

$$(x_{1p}, y_{1p}, z_{1p}, w_{1p}) = \frac{1}{c_1 w_{1nm}}(x_{1np}, y_{1np}, z_{1np}, w_{1np})$$

$$(x_{2p}, y_{2p}, z_{2p}, w_{2p}) = \frac{1}{c_2 w_{2nm}}(x_{2np}, y_{2np}, z_{2np}, w_{2np})$$

Thus, the final representation of $(x_w, y_w, z_w, 1/w_p)$ becomes:

$$1/w_p = \frac{c_1 w_{1nm}(ax_{2np} + by_{2np} + cz_{2np} + dw_{2np}) - c_2 w_{2nm}(ax_{1np} + by_{1np} + cz_{1np} + dw_{1np})}{w_{1np}(ax_{2np} + by_{2np} + cz_{2np}) - w_{2np}(ax_{1np} + by_{1np} + cz_{1np})}$$

$$x_w = \frac{b(x_{1np}y_{2np} - x_{2np}y_{1np}) + c(x_{1np}z_{2np} - x_{2np}z_{1np}) + d(x_{1np}w_{2np} - x_{2np}w_{1np})}{w_{1np}(ax_{2np} + by_{2np} + cz_{2np}) - w_{2np}(ax_{1np} + by_{1np} + cz_{1np})}$$

$$y_w = \frac{a(y_{1np}x_{2np} - y_{2np}x_{1np}) + c(y_{1np}z_{2np} - y_{2np}z_{1np}) + d(y_{1np}w_{2np} - y_{2np}w_{1np})}{w_{1np}(ax_{2np} + by_{2np} + cz_{2np}) - w_{2np}(ax_{1np} + by_{1np} + cz_{1np})}$$

$$z_w = \frac{a(z_{1np}x_{2np} - z_{2np}x_{1np}) + b(z_{1np}y_{2np} - z_{2np}y_{1np}) + d(z_{1np}w_{2np} - z_{2np}w_{1np})}{w_{1np}(ax_{2np} + by_{2np} + cz_{2np}) - w_{2np}(ax_{1np} + by_{1np} + cz_{1np})}$$

And the representation of $(x_p, y_p, z_p, w_p)$ $$w_p = \frac{w_{1np}(ax_{2np} + by_{2np} + cz_{2np}) - w_{2np}(ax_{1np} + by_{1np} + cz_{1np})}{c_1 w_{1nm}(ax_{2np} + by_{2np} + cz_{2np} + dw_{2np}) - c_2 w_{2nm}(ax_{1np} + by_{1np} + cz_{1np} + dw_{1np})}$$

$$x_p = \frac{b(x_{1np}y_{2np} - x_{2np}y_{1np}) + c(x_{1np}z_{2np} - x_{2np}z_{1np}) + d(x_{1np}w_{2np} - x_{2np}w_{1np})}{c_1 w_{1nm}(ax_{2np} + by_{2np} + cz_{2np} + dw_{2np}) - c_2 w_{2nm}(ax_{1np} + by_{1np} + cz_{1np} + dw_{1np})}$$

$$y_p = \frac{a(y_{1np}x_{2np} - y_{2np}x_{1np}) + c(y_{1np}z_{2np} - y_{2np}z_{1np}) + d(y_{1np}w_{2np} - y_{2np}w_{1np})}{c_1 w_{1nm}(ax_{2np} + by_{2np} + cz_{2np} + dw_{2np}) - c_2 w_{2nm}(ax_{1np} + by_{1np} + cz_{1np} + dw_{1np})}$$

$$z_p = \frac{a(z_{1np}x_{2np} - z_{2np}x_{1np}) + b(z_{1np}y_{2np} - z_{2np}y_{1np}) + d(z_{1np}w_{2np} - z_{2np}w_{1np})}{c_1 w_{1nm}(ax_{2np} + by_{2np} + cz_{2np} + dw_{2np}) - c_2 w_{2nm}(ax_{1np} + by_{1np} + cz_{1np} + dw_{1np})}$$

In case the new intersection point will participate in further clipping, it can be written in NHCS form:

$$x_{np} = b(x_{1np}y_{2np} - x_{2np}y_{1np}) + c(x_{1np}z_{2np} - x_{2np}z_{1np}) + d(x_{1np}w_{2np} - x_{2np}w_{1np})$$

$$y_{np} = a(y_{1np}x_{2np} - y_{2np}x_{1np}) + c(y_{1np}z_{2np} - y_{2np}z_{1np}) + d(y_{1np}w_{2np} - y_{2np}w_{1np})$$

$$z_{np} = a(z_{1np}x_{2np} - z_{2np}x_{1np}) + b(z_{1np}y_{2np} - z_{2np}y_{1np}) + d(z_{1np}w_{2np} - z_{2np}w_{1np})$$

$$w_{np} = w_{1np}(ax_{2np} + by_{2np} + cz_{2np}) - w_{2np}(ax_{1np} + by_{1np} + cz_{1np})$$

And $$Cw = c_1 w_{1nm}(ax_{2np} + by_{2np} + cz_{2np} + dw_{2np}) - c_2 w_{2nm}(ax_{1np} + by_{1np} + cz_{1np} + dw_{1np})$$

Here, C is the shifted bits and w is the weight, and the interpolate parameter is:

$$T_p = \frac{w_p - w_{1p}}{w_{2p} - w_{1p}}$$

$$= \frac{-c_2 w_{2nm}(ax_{1np} + by_{1np} + cz_{1np} + dw_{1np})}{c_1 w_{1nm}(ax_{2np} + by_{2np} + cz_{2np} + dw_{2np}) - c_2 w_{2nm}(ax_{1np} + by_{1np} + cz_{1np} + dw_{1np})}$$

Miscellaneous Functions

There are some functions that have not been discussed in the previous sections. These functions include: (1) NHCS functions that perform NHCS conversion; and (2) EffiDigit functions that calculates efficient digit of an integer. These functions will now be discussed.

| Calculate Efficient Digits in UFIX8 |  |
| --- | --- |
| UFIX8 EffiDigit_UFIX8(UFIX8 a) This function calculates efficient digits in an UFIX8 integer | |
| Parameters | a |
| | Input integer, unsigned 8-bits integer in UFIX8 format |
| Return value | Efficient digit of the integer, which equals ceil(log$_2$(abs(a))) in UFIX8 format. |
| Remarks | Using Bisearch algorithm |

| Calculate Efficient Digits in SFIX32 |  |
| --- | --- |
| UFIX8 EffiDigit_SFIX32(SFIX32 a) This function calculates efficient digits in an SFIX32 integer | |
| Parameters | a |
| | Input integer, signed 32-bits integer in SFIX32 format |
| Return value | Efficient digit of the integer, which equals ceil(log$_2$(abs(a))) in UFIX8 format. |
| Remarks | Using Bisearch algorithm |

| Calculate Efficient Digits in SFIX64 |  |
| --- | --- |
| UFIX8 EffiDigit_SFIX64(SFIX64 a) This function calculates efficient digits in an SFIX64 integer | |
| Parameters | a |
| | Input integer, signed 64-bits integer in SFIX64 format |
| Return value | Efficient digit of the integer, which equals ceil(log$_2$(abs(a))) in UFIX8 format. |
| Remarks | Using Bisearch algorithm |

| Conversion from SFIX64Quad to SFIX32Quad NHCS | |
|---|---|
| int NHCS_SFIX64Quad (SFIX64Quad a, SFIX32Quad b) | |
| This functions convert from non-NHCS to NHCS | |
| Parameters | a |
| | Input integers, signed 64-bits Quad, in SFIX64Quad format. |
| | b |
| | Output integers, signed 32-bits Quad, in SFIX32Quad, NHCS format. |
| Return value | An integer records shift bits from 64-bit non-NHCS to 32-bit NHCS. |
| Remarks | NHCS_SFIX64Quad is used in transform. In transform, we need not shift when efficient digits of maximum component are less than storage bits. In clip space has either NHCS or non-NHCS, For recovering the correct w, it needs to record the shift bits. |

| Conversion from SFIX64Triple to SFIX16Triple NHCS | |
|---|---|
| Void NHCS_SFIX64Triple(SFIX64Triple a, SFIX16Triple b) | |
| This functions perform NHCS conversion | |
| Parameters | a |
| | Input integers, signed 64-bits Triple, non-NHCS |
| | b |
| | output integers, signed 16-bits Triple, NHCS |
| Return value | No return value |
| Remarks | NHCS_SFIX64Triple is used in lighting before normalization. Either efficient digit of maximum component is less than storage bits or not, we need shift to preserve precision. |

| Conversion from SFIX64Triple to SFIX16Triple NHCS | |
|---|---|
| Void NHCS_SFIX64Triple(SFIX32Triple a, SFIX16Triple b) | |
| This functions perform NHCS conversion | |
| Parameters | a |
| | Input integers, signed 32-bits Triple, non-NHCS |
| | b |
| | output integers, signed 16-bits Triple, NHCS |
| Return value | No return value |
| Remarks | NHCS_SFIX32Triple is used in lighting before normalization. Either efficient digit of maximum component is less than storage bits or not, we need shift to preserve precision. |

The foregoing description of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description of the invention, but rather by the claims appended hereto.

What is claimed is:

1. A computer-implemented method for processing rendering data containing vertices, comprising:
   defining a vertex cache as a software cache located within a transform and lighting module and containing vertices in a floating-point format;
   determining that a first vertex of the rendering data has already been transformed but not lighted and storing the first vertex in the vertex cache such that the first vertex bypasses a transformation module of the transform and lighting module;
   converting the vertices in a floating-point format into a normalized homogeneous coordinate system (NHCS) fixed-point format by performing lighting and texture generation and transformation to obtain NHCS fixed-point format vertices;
   performing view frustum clipping on the NHCS fixed-point format vertices after the lighting and texture generation and transformation;
   transforming vertices of the rendering data that have not already been transformed from model space into clip space; and
   continuing to store vertices of the rendering data that have already been transformed but not lighted in the vertex cache as needed to facilitate a single streamline branched architecture that avoids processing duplication of the vertices;
   wherein defining a vertex cache, determining that a first vertex of the rendering data has already been transformed, converting the vertices, performing view frustum clipping, transforming vertices, and continuing to store vertices are performed using a processing device of the computer.

2. The computer-implemented method of claim 1, further comprising examining each of the vertices before lighting to determine whether to cull.

3. The computer-implemented method of claim 2, further comprising discarding any vertices that are culled.

4. The computer-implemented method of claim 3, further comprising continuing processing of any vertices that are not culled.

5. The computer-implemented method of claim 1, further comprising using Direct3D for mobile as a rendering standard.

6. A computer-readable storage medium having stored and encoded thereon computer-executable instructions for performing on a computing device the computer-implemented method recited in claim 1.

7. A process for transforming and lighting rendering data, comprising:
   inputting rendering data in model space containing vertices in a floating-point format;
   converting the vertices in the floating-point format into a normalized homogeneous coordinate system (NHCS) fixed-point format;
   transforming vertices in a NHCS fixed-point format in the rendering data from model space to clip space to generate transformed vertices;
   culling a transformed vertex of the transformed vertices prior to processing by a lighting module after determining that the transformed vertex is not needed; and lighting each of the transformed vertices using the lighting module, except for the culled transformed vertex, to compute color and generate transformed and lighted vertices from the rendering data;

wherein inputting rendering data, converting the vertices, transforming vertices, culling a transformed vertex, and lighting each of the transformed vertices are performed using a computer processing device.

8. The process as set forth in claim 7, further comprising examining each of the transformed vertices to determine whether they have previously been lighted.

9. The process as set forth in claim 7, further comprising determining that the culled transformed vertex forms a back face of a triangle.

10. The process as set forth in claim 9, further comprising discarding the culled transformed vertex.

11. The process as set forth in claim 7, further comprising determining that the culled transformed vertex is outside of one view frustum clip plane.

12. The process as set forth in claim 11, further comprising discarding the culled transformed vertex.

13. One or more computer-readable storage media having stored and encoded thereon computer-readable instructions thereon which, when executed by one or more processors on a computing device, cause the one or more processors on the computing device to implement the process of claim 7.

14. A computer-implemented process stored and encoded on a computer-readable storage medium for rendering graphics on an embedded device, comprising:
    inputting 3D data containing vertices in model space in a floating-point format;
    converting the 3D data in a floating-point format into a normalized homogeneous coordinate system (NHCS) fixed-point format in clip space to obtain NHCS fixed-point format vertices;
    generating coordinates for the NHCS fixed-point format vertices by performing lighting and texture generation and transformation;
    examining each of the NHCS fixed-point format vertices before lighting to determine whether to cull the NHCS fixed-point format vertices;
    storing the NHCS fixed-point format vertices as needed in a vertex cache to provide a single streamline branched architecture that avoids processing duplication of the NHCS fixed-point format vertices; and
    performing view frustum clipping of the NHCS fixed-point format vertices to generate an output of 2D screen coordinates to render the graphics represented by the rendering data on the embedded device; wherein inputting 3D data, converting the 3D data, generating coordinates, examining vertices, storing vertices and performing view frustum clipping are performed using a computer processing device.

15. The computer-implemented process of claim 14, wherein examining each of the NHCS fixed-point format vertices before lighting further comprises determining whether any of the NHCS fixed-point format vertices form a back face of a triangle and, if so, culling those NHCS fixed-point format vertices.

16. The computer-implemented process of claim 15, further comprising discarding each of the culled NHCS fixed-point format vertices and continuing to process NHCS fixed-point format vertices that have not been culled.

17. The computer-implemented process of claim 14, wherein examining each of the NHCS fixed-point format vertices before lighting further comprises determining whether any of the NHCS fixed-point format vertices are outside of one view frustum clip plane and, if so, culling those NHCS fixed-point format vertices.

18. The computer-implemented process of claim 17, further comprising discarding each of the culled NHCS fixed-point format vertices and continuing to process NHCS fixed-point format vertices that have not been culled.

19. The computer-implemented process of claim 14, wherein the vertex cache is contained in software and not in hardware.

20. The computer-implemented process of claim 14, wherein the view frustum clipping is performed after a lighting and texture generation and transformation of the NHCS fixed-point format vertices.

21. A transform and lighting module for preparing rendering data in a floating-point format for rendering, comprising:
    an embedded computing device;
    a computer-readable storage medium having stored and encoded thereon a computer program having program modules containing computer-executable instructions that are executable by the embedded computing device, the computer program further comprising:
        a transformation module that converts vertices in a floating-point format in the rendering data into a normalized homogeneous coordinate system (NHCS) fixed-point format in clip space to generate transformed vertices;
        a vertex cache implemented as a software cache and located within the transform and lighting module that stores a first vertex contained in the rendering data such that the first vertex has previously been transformed but has not previously been lighted such that the first vertex is not processed by the transformation module;
        a lighting module that computes color for each of the transformed vertices;
        a culling module positioned after the transformation module and before the lighting module that culled a second vertex from the transformed vertices prior to processing by the lighting module after determining that the second vertex was not needed such that the second vertex is not processed by the lighting module;
        a texture generation and texture transformation module that computes texture coordinates and transforms the texture coordinates into a fixed-point format in a normalized homogeneous coordinate system (NHCS) to obtain NHCS fixed-point format vertices in clip space; and
        a view frustum module positioned after the lighting module and after the texture generation and transformation module that performs view frustum clipping of the NHCS fixed-point format vertices in clip space to generate output data that can be rendered for display on a display device of the embedded computing device.

22. The transformation and lighting module as set forth in claim 21, wherein the culling module performs at least one of: (a) back face culling; (b) view frustum culling.

* * * * *